United States Patent
Kim et al.

(10) Patent No.: US 11,121,891 B2
(45) Date of Patent: Sep. 14, 2021

(54) METHOD AND APPARATUS FOR TRANSMITTING SOUNDING REFERENCE SIGNAL

(71) Applicant: ELECTRONICS AND TELECOMMUNICATIONS RESEARCH INSTITUTE, Daejeon (KR)

(72) Inventors: Cheul Soon Kim, Daejeon (KR); Sung Hyun Moon, Daejeon (KR); Jung Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 21 days.

(21) Appl. No.: 16/804,865

(22) Filed: Feb. 28, 2020

(65) Prior Publication Data

US 2020/0280465 A1    Sep. 3, 2020

(30) Foreign Application Priority Data

Feb. 28, 2019 (KR) .................. 10-2019-0024399
Mar. 27, 2019 (KR) .................. 10-2019-0035362
(Continued)

(51) Int. Cl.
*H04L 25/02* (2006.01)
*H04L 5/00* (2006.01)
(Continued)

(52) U.S. Cl.
CPC ........ *H04L 25/0226* (2013.01); *H04L 5/0007* (2013.01); *H04L 5/0051* (2013.01); *H04L 27/2607* (2013.01); *H04W 80/08* (2013.01)

(58) Field of Classification Search
CPC . H04L 5/0053; H04L 5/0048; H04L 27/2607; H04L 25/0226; H04L 5/0007;
(Continued)

(56) References Cited

U.S. PATENT DOCUMENTS

2016/0100407 A1    4/2016 Gaal et al.
2016/0373227 A1*  12/2016 Sun ................. H04L 5/0094
(Continued)

FOREIGN PATENT DOCUMENTS

WO    2018028257 A1    2/2018
WO    2018128401 A1    7/2018
WO    2018203653 A1   11/2018

*Primary Examiner* — Sung S Ahn
(74) *Attorney, Agent, or Firm* — Rabin & Berdo, P.C.

(57) ABSTRACT

An operation method of a terminal for transmitting a sounding reference signal (SRS) to a base station in a wireless communication system may comprise receiving a higher layer message including information on a position of an SRS resource for transmission of the SRS from the base station; receiving a trigger signal from the base station, the trigger signal triggering the transmission of the SRS and including index information of the position of the SRS resource; performing a channel sensing operation on a radio resource indicated by the information on the positions of the SRS resource and the index information; and transmitting the SRS to the base station based on a result of the channel sensing.

20 Claims, 11 Drawing Sheets

(30) Foreign Application Priority Data

| May 17, 2019 | (KR) | ........................ 10-2019-0057926 |
| Jul. 5, 2019 | (KR) | ........................ 10-2019-0081495 |
| Nov. 20, 2019 | (KR) | ........................ 10-2019-0149835 |
| Feb. 14, 2020 | (KR) | ........................ 10-2020-0018449 |
| Feb. 27, 2020 | (KR) | ........................ 10-2020-0024568 |

(51) Int. Cl.
    *H04L 27/26*     (2006.01)
    *H04W 80/08*     (2009.01)

(58) Field of Classification Search
    CPC ............ H04L 5/0051; H04W 72/0446; H04W 72/044; H04W 80/08
    See application file for complete search history.

(56) References Cited

U.S. PATENT DOCUMENTS

| 2017/0164213 | A1 | 6/2017 | Lim et al. | |
| 2017/0230972 | A1 | 8/2017 | Wang et al. | |
| 2017/0251464 | A1 | 8/2017 | Mukherjee | |
| 2017/0366377 | A1 | 12/2017 | Papasakellariou | |
| 2019/0199497 | A1* | 6/2019 | Park | H04B 7/0695 |
| 2019/0356446 | A1 | 11/2019 | Kim et al. | |

* cited by examiner

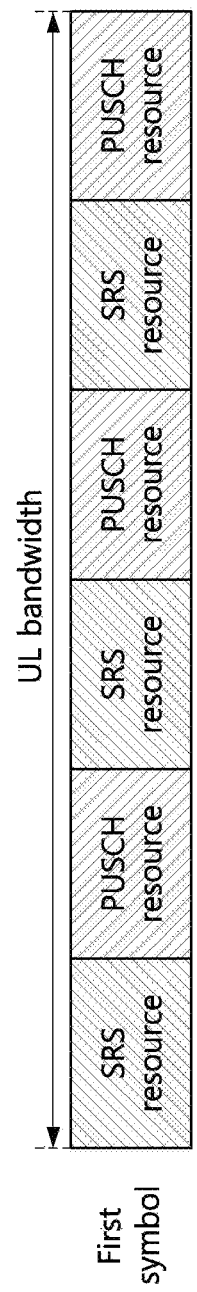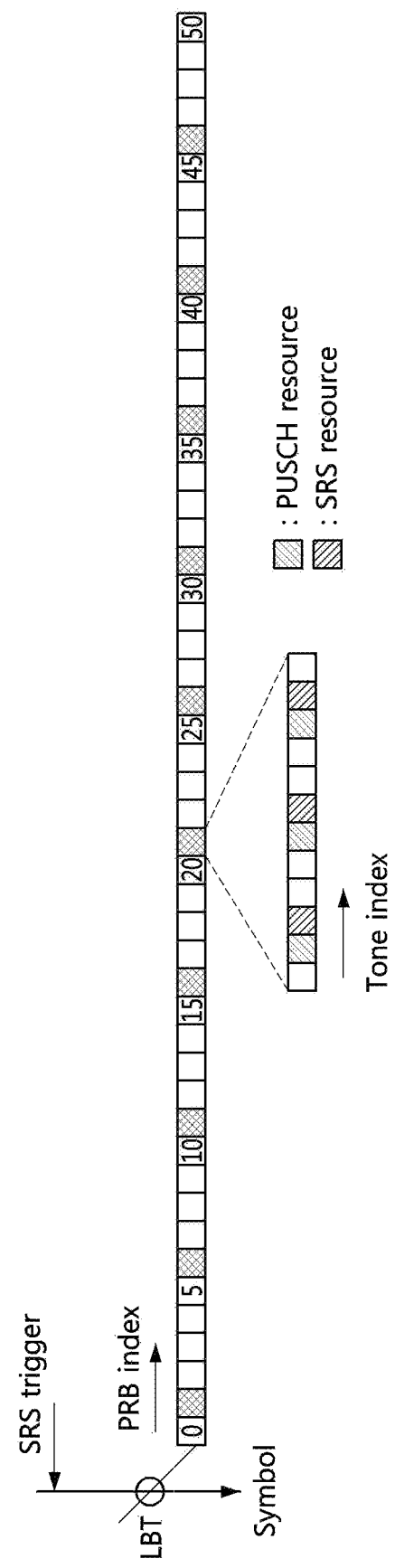

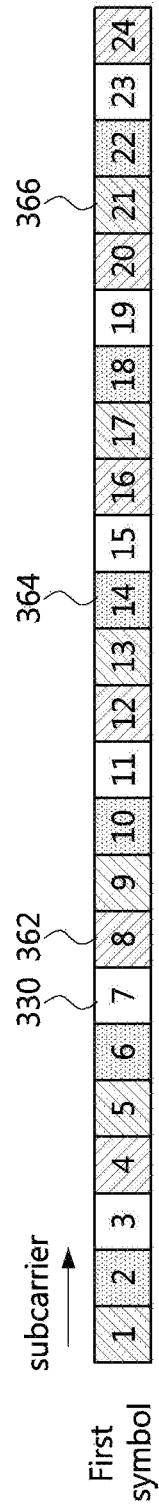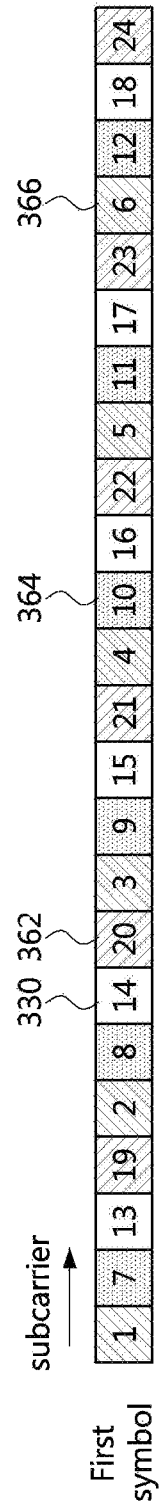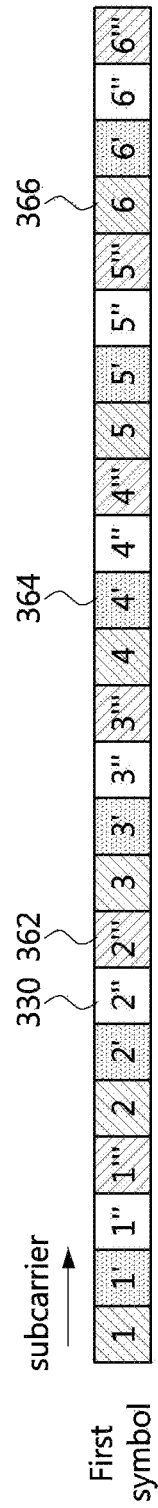

METHOD AND APPARATUS FOR TRANSMITTING SOUNDING REFERENCE SIGNAL

CROSS-REFERENCE TO RELATED APPLICATIONS

This application claims priority to Korean Patent Applications No. 10-2019-0024399 filed on Feb. 28, 2019, No. 10-2019-0035362 filed on Mar. 27, 2019, No. 10-2019-0057926 filed on May 17, 2019, No. 10-2019-0081495 filed on Jul. 5, 2019, No. 10-2019-0149835 filed on Nov. 20, 2019, No. 10-2020-0018449 filed on Feb. 14, 2020, and No. 10-2020-0024568 filed on Feb. 27, 2020 with the Korean Intellectual Property Office (KIPO), the entire contents of which are hereby incorporated by reference.

BACKGROUND

1. Technical Field

The present disclosure relates generally to a method of transmitting a sounding reference signal (SRS) in a wireless communication system, and more specifically, to a method and an apparatus for transmitting an SRS for enhancing channel estimation performance at a base station.

2. Related Art

The communication system (hereinafter, a new radio (NR) communication system) using a higher frequency band (e.g., a frequency band of 6 GHz or above) than a frequency band (e.g., a frequency band of 6 GHz or below) of the long term evolution (LTE) (or, LTE-A) is being considered for processing of soaring wireless data. The NR communication system may support not only a frequency band below 6 GHz but also 6 GHz or higher frequency band, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like.

In a general wireless communication system, information transmitted from a terminal to a base station is referred to as UL control information (UCI). Examples of such the UCI include a scheduling request requested by the terminal to the base station, a downlink (DL) channel quality indicator, and acknowledgment of DL data.

Since a dynamic time division duplex (TDD), beam-centric communication, or low-latency communication is supported by a communication system using an unlicensed band, the number of UL symbols in which the terminal is allowed to transmit the UCI may be variable and limited.

As an example where the number of UL symbols is variable, the base station may indicate the number of UL symbols to the terminal through higher layer signaling, or may indicate the number of UL symbols to the terminal through a combination of scheduling information and higher layer signaling.

As an example where the number of UL symbols is limited, the base station operating in the TDD scheme may limit the number of UL symbols to a small number for the purpose of more effectively supporting DL traffic in the corresponding slot. Therefore, in the communication system using an unlicensed band, time-domain resources of a physical channel for transmitting the SRS may be variable, and the communication system should operate with a small amount of time-domain resources.

SUMMARY

Accordingly, exemplary embodiments of the present disclosure provide a method and an apparatus for transmitting an SRS, which can prevent collision between a PUSCH and the SRS, when the SRS is allowed to be transmitted together with the PUSCH in the same subband.

According to an exemplary embodiment of the present disclosure, an operation method of a terminal for transmitting a sounding reference signal (SRS) to a base station in a wireless communication system may comprise receiving a higher layer message including information on a position of an SRS resource for transmission of the SRS from the base station; receiving a trigger signal from the base station, the trigger signal triggering the transmission of the SRS and including index information of the position of the SRS resource; performing a channel sensing operation on a radio resource indicated by the information on the positions of the SRS resource and the index information; and transmitting the SRS to the base station based on a result of the channel sensing.

The SRS resource may include at least one SRS transmission slot determined based on the result of channel sensing on the radio resource, and the at least one SRS transmission slot may include at least one SRS symbol.

A first symbol constituting the SRS may be an arbitrary orthogonal frequency division multiplexing (OFDM) symbol included in the at least one SRS transmission slot.

The trigger signal may indicate at least one among candidate(s) of the at least one SRS transmission slot among a plurality of slots, an offset between the at least one SRS transmission slot, and a candidate of a first SRS symbol among symbol(s) included in each of the at least one SRS transmission slot.

In the transmitting of the SRS to the base station, the SRS may be transmitted in a symbol #n of a slot, in which a transmission opportunity is secured according to the result of the channel sensing, and an initial signal may be transmitted before transmitting the radio resource.

The initial signal may be generated based on a cyclic prefix (CP) of one among a first symbol, the symbol #n, and a symbol #n+1, which constitute the SRS.

The SRS may be mapped contiguously with a physical uplink control channel (PUCCH) and/or a physical uplink shared channel (PUSCH), which is included in the radio resource.

According to another exemplary embodiment of the present disclosure, an operation method of a base station for receiving a sounding reference signal (SRS) in a wireless communication system may comprise configuring a position of an SRS resource for receiving the SRS; transmitting a higher layer message including information on the position of the SRS resource to a terminal; generating a trigger signal and transmitting the trigger signal to the terminal, the trigger signal triggering transmission of the SRS and including index information of the position of the SRS resource; and receiving the SRS from the terminal.

The SRS resource may include at least one SRS transmission slot, and the at least one SRS transmission slot may include at least one SRS symbol.

A first symbol constituting the SRS may be an arbitrary orthogonal frequency division multiplexing (OFDM) symbol of each of the at least one SRS transmission slot.

The trigger signal may indicate at least one among candidate(s) of the at least one SRS transmission slot among a plurality of slots, an offset between the at least one SRS transmission slot, a candidate of the at least one SRS symbol among symbols included in each of the at least one SRS transmission slot, and an offset between the at least one SRS symbol.

The trigger signal may further indicate a first symbol among the at least one SRS symbol.

The SRS may be mapped contiguously with a physical uplink control channel (PUCCH) and/or a physical uplink shared channel (PUSCH).

According to yet another exemplary embodiment of the present disclosure, a terminal for transmitting a sounding reference signal (SRS) to a base station in a wireless communication system may comprise a processor; and a memory storing at least one instruction executable by the processor, wherein when executed by the processor, the at least one instruction causes the processor to receive a higher layer message including information on a position of an SRS resource for transmission of the SRS from the base station; receive a trigger signal from the base station, the trigger signal triggering the transmission of the SRS and including index information of the position of the SRS resource; perform a channel sensing operation on a radio resource indicated by the information on the positions of the SRS resource and the index information; and transmit the SRS to the base station based on a result of the channel sensing.

The SRS resource may include at least one SRS transmission slot determined based on the result of channel sensing on the radio resource, and the at least one SRS transmission slot may include at least one SRS symbol.

A first symbol constituting the SRS may be an arbitrary orthogonal frequency division multiplexing (OFDM) symbol included in the at least one SRS transmission slot.

In the performing of the channel sensing operation on the radio resource, the at least one instruction may further cause the processor to acquire a transmission opportunity by performing a channel sensing at an offset interval indicated by the trigger signal from a first SRS symbol indicated by the trigger signal among the at least one SRS symbol.

In the transmitting of the SRS to the base station, the at least one instruction may further cause the processor to transmit the SRS through a first SRS symbol # n among SRS symbols for which the transmission opportunity is secured by a result of the channel sensing, and transmit an initial signal before transmitting the SRS.

The initial signal may be generated based on a cyclic prefix (CP) of one among a first symbol, the symbol #n, and a symbol #n+1, which constitute the SRS.

The SRS may be mapped contiguously with a physical uplink control channel (PUCCH) and/or a physical uplink shared channel (PUSCH), which is included in the radio resource.

According to the exemplary embodiments of the present disclosure, the base station allows transmission of a sounding reference signal (SRS) through an interlace structure and a comb structure of the same subband in which a physical uplink shared channel (PUSCH) is transmitted, thereby preventing collision between the PUSCH and the SRS.

According to the exemplary embodiments of the present disclosure, the terminal can improve the channel estimation performance at the base station by transmitting the SRS in a wide band.

BRIEF DESCRIPTION OF DRAWINGS

Exemplary embodiments of the present disclosure will become more apparent by describing in detail embodiments of the present disclosure with reference to the accompanying drawings, in which:

FIG. 4 is a conceptual diagram illustrating a first exemplary embodiment of an SRS resource of the present disclosure;

FIG. 5 is a conceptual diagram illustrating a second exemplary embodiment of an SRS resource of the present disclosure;

FIG. 8 is a conceptual diagram illustrating a first exemplary embodiment of an SRS mapping method for SRS resource;

FIG. 9 is a conceptual diagram illustrating a second exemplary embodiment of an SRS mapping method for SRS resource;

FIG. 10 is a conceptual diagram illustrating a third exemplary embodiment of an SRS mapping method for SRS resource;

Figure 1:
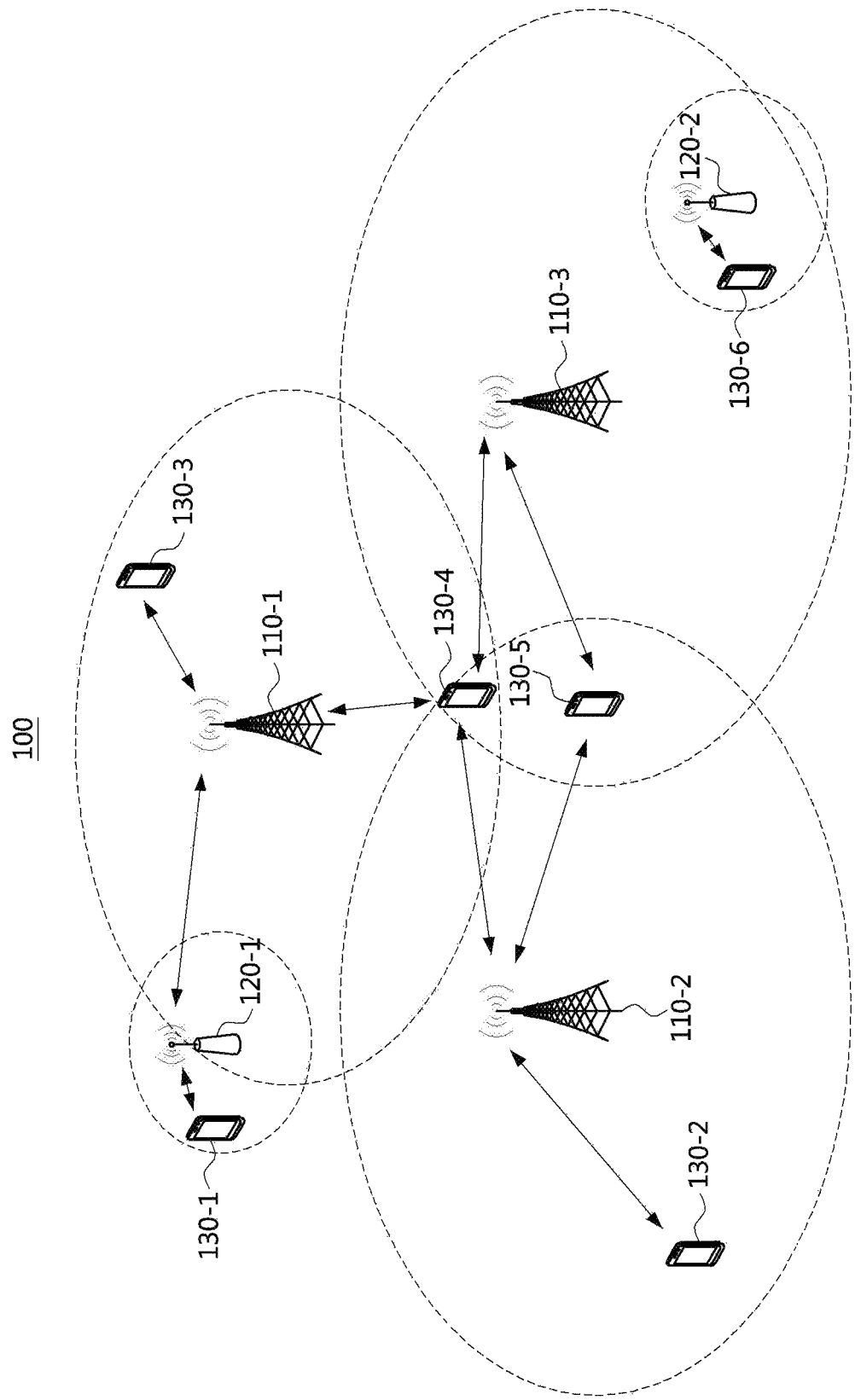
FIG. 1 is a conceptual diagram illustrating a first exemplary embodiment of a communication system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

While the present disclosure is susceptible to various modifications and alternative forms, specific embodiments are shown by way of example in the drawings and described in detail. It should be understood, however, that the description is not intended to limit the present disclosure to the specific embodiments, but, on the contrary, the present disclosure is to cover all modifications, equivalents, and alternatives that fall within the spirit and scope of the present disclosure.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present disclosure. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present disclosure pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present disclosure will be described in greater detail with reference to the accompanying drawings. To facilitate overall understanding of the present disclosure, like numbers refer to like elements throughout the description of the drawings, and description of the same component will not be reiterated.

Throughout the entire specification, a terminal may refer to a mobile station (MS), a mobile terminal (MT), an advanced mobile station (AMS), a highly reliable mobile station (HR-MS), a subscriber station (SS), a portable subscriber station (PSS), an access terminal (AT), a user equipment (UE), a machine type communication device (MTC device) or the like, and may include all or part of functions of the MT, MS, AMS, HR-MS, SS, PSS, AT, UE, or the like.

In addition, a base station (BS) may refer to an advanced base station (ABS), a high reliability base station (HR-BS), a Node B, am evolved node B (eNodeB), an access point (AP), a radio access station (RAS), a base transceiver station (BTS), a mobile multihop relay (MMR)-BS, a relay station (RS) performing a role of the base station, a relay node (RN) performing a role of the base station, an advanced relay station (ARS) performing a role of the base station, a high reliability relay station (HR-RS) performing a role of the base station, a small base stations (e.g., a femto BS, a home node B (HNB), a home eNodeB (HeNB), a pico base station (pico BS), a macro base station (macro BS), a micro base station (micro BS), etc.), or the like, and may include all or part of functions of the ABS, Node B, eNodeB, AP, RAS, BTS, MMR-BS, RS, RN, ARS, HR-RS, small base station, or the like.

The base station configures one or more cells, and the terminal establishes an RRC connection with at least one cell of the corresponding base station. Here, a cell having an RRC connection is referred to as a serving cell.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system 100 may be referred to as a 'communication network'. Each of the plurality of communication nodes may support at least one communication protocol. Each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, orthogonal frequency division multiple access (OFDMA) based communication protocol, single carrier FDMA (SC-FDMA) based communication protocol, non-orthogonal multiple access (NOMA) based communication protocol, space division multiple access (SDMA) based communication protocol, or the like. Each of the plurality of communication nodes may have the following structure.

Figure 2:
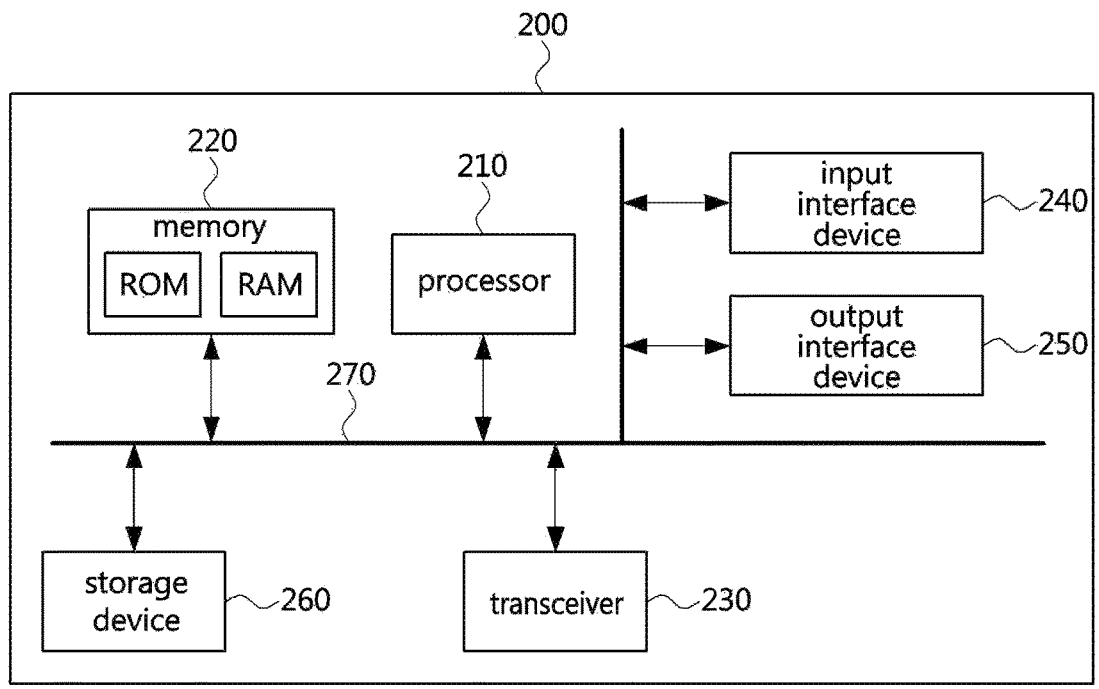
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring back to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), base transceiver station (BTS), radio base station, radio transceiver, access point (AP), access node, road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as terminal, access terminal, mobile terminal, station, subscriber station, mobile station, portable subscriber station, node, device, or the like.

Each of the plurality of communication nodes 110-1, 110-2, 110-3, 120-1, 120-2, 130-1, 130-2, 130-3, 130-4, 130-5, and 130-6 may support cellular communication (e.g., long term evolution (LTE), LTE-Advanced (LTE-A), etc., which are defined in the 3rd generation partnership project (3GPP) specification). Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink transmission, and may support SC-FDMA-based uplink transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multi-point (CoMP) transmission, a carrier aggregation (CA) transmission, a transmission in unlicensed band, a device-to-device (D2D) communication (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and the operations supported by the plurality of base stations 110-1, 110-2, 110-3, 120-1, and 120-2.

For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner. Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Figure 3:
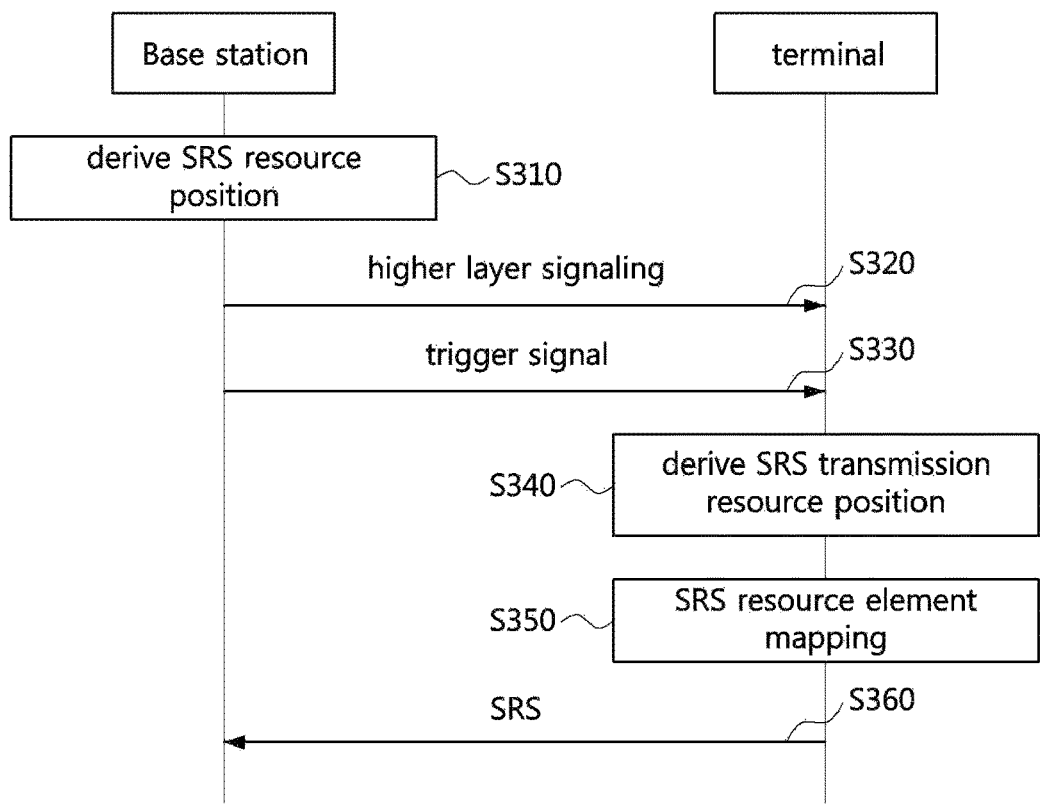
FIG. 3 is a sequence chart illustrating an exemplary embodiment of a method for transmitting a sounding reference signal (SRS) of the present disclosure.

FIG. 3 is a sequence chart illustrating an exemplary embodiment of a method for transmitting a sounding reference signal (SRS) of the present disclosure.

Referring to FIG. 3, the base station may derive a position of an SRS resource (e.g., frequency resource position and time resource position) for SRS transmission (S310). Time resource position information may indicate one or more uplink (UL) sub-slots, and the corresponding UL sub-slots may be located in the last symbols or in the middle of an UL slot. Here, the base station may derive frequency resource position information for SRS transmission by using a transmission comb (TC) value, a bandwidth configuration parameter, a bandwidth parameter, a frequency hopping bandwidth parameter, frequency domain position information, and the like.

The base station may indicate the position of the SRS resource to the terminal. That is, the base station may transmit information on the position of the resource for SRS transmission to the terminal. The base station may transmit information on the position(s) of at least one SRS resource for SRS transmission to the terminal using higher layer signaling. The base station may transmit a part of information for configuring the SRS resource(s) to the terminal (S320). In addition, the base station may transmit the remaining configuration information that has not been transmitted through higher layer signaling among the information for configuring the SRS resource to the terminal through a trigger signal (S330).

The base station may transmit an SRS resource index, which is the information for configuring the SRS resource, to the terminal through higher layer signaling (S320). The SRS resource index may include frequency resource information, sequence information, and antenna port information, and the SRS resource indexes may be preconfigured for the respective SRS resources in form of a list.

In a wireless communication network using an unlicensed band, a time resource for transmitting the SRS may have dynamic properties according to a listen before talk (LBT) procedure. Therefore, information on the time resource for transmitting the SRS may be included in a trigger signal. The base station may transmit the trigger signal to the terminal through some of downlink control information (DCI) fields in a downlink control channel for assigning a physical downlink shared channel (PDSCH) or assigning a PUSCH (S330). Alternatively, the base station may instruct multiple terminals to trigger the SRS transmission through a specific preconfigured DCI format. The base station may indicate to the terminal time resources for transmitting the SRS through higher layer signaling in form of indexes.

The terminal may obtain information on the position of the SRS resource from higher layer signaling and a DL control channel received from the base station (S340). The terminal may derive candidate resources of SRS resource elements (REs) from the index of the trigger signal. The terminal may determine the time resource for transmitting the SRS according to channel sensing (e.g., LBT procedure) on the radio resource indicated by the information on the position of the SRS resource of the higher layer signaling and the index information of the trigger signal. The terminal may perform the LBT operation even before the starting time point of the radio resource indicated by the higher layer signaling and trigger signal. The terminal may map the SRS to the SRS resource elements based on the channel sensing result of the radio resource indicated by the information on the SRS resource position (S350). The terminal may map the SRS in the order of time resources, and then map the SRS in the order of frequency resources. As another example, the terminal may map the SRS in the order of frequency resources, and then map the SRS in the order of time resources.

The terminal may map the SRS to at least one SRS resource element, and transmit a subframe including the at least one resource element to the base station (S360). Therefore, the terminal may transmit the SRS to the base station (S360). The specific configuration of the SRS resource may be as described below.

The base station performing wireless communication in an unlicensed band may configure the resource for transmitting the SRS through higher layer signaling. The base station may transmit an index indicating the SRS resource to the terminal through a DL control channel. The DL control channel may include a trigger field that triggers the SRS transmission of the terminal and a time field indicating information on the transmission time point of the SRS. The trigger field may indicate the index of SRS resources to be allocated to the terminal. The time field may indicate the first resource (e.g., subframe, slot, symbol, etc.) of the SRS resource to be allocated to the terminal. Alternatively, the DL control channel may include only one field without distinguishing the trigger field and the time field. This field may be represented by an index configured by higher layer signaling, and as one index, the field may indicate time resource and frequency resource for transmitting the SRS.

The SRS resource may include at least one comb (e.g., comb having an interval of 2 subcarriers or 4 subcarriers) arranged at a regular interval of subcarriers. On the other hand, a PUSCH resource may include at least one interlace arranged at a regular interval of physical resource blocks (PRBs). Therefore, the SRS resource may be time division multiplexed (TDMed) with a PUSCH in the same symbol, but may not be frequency division multiplexed (FDMed) with a PUSCH in the same symbol. Therefore, in some subcarriers, the SRS may overlap a PUSCH, but in some other subcarriers, the SRS may not overlap a PUSCH.

FIG. 4 is a conceptual diagram illustrating a first exemplary embodiment of an SRS resource of the present disclosure.

Referring to FIG. 4, an SRS resource according to an exemplary embodiment of the present disclosure may include at least one interlace arranged at a regular interval of physical resource blocks (PRBs). The base station may transmit information on the SRS resource including at least one interlace to the terminal through higher layer signaling.

The terminal may receive the higher layer signaling and a DL control channel from the base station. The terminal may map the SRS to SRS resource elements belonging to the preconfigured interlace. The SRS resource elements and a PUSCH may be arranged in PRBs belonging to different interlaces. Therefore, the terminal may map the SRS and the PUSCH to different interlaces in a FDM scheme.

FIG. 5 is a conceptual diagram illustrating a second exemplary embodiment of an SRS resource of the present disclosure.

Referring to FIG. 5, each interlace of an SRS resource according to another exemplary embodiment of the present disclosure may include at least one comb arranged at a regular interval of subcarriers. The base station may transmit information on the SRS resource including at least one interlace and at least one comb to the terminal through higher layer signaling.

The terminal may receive the higher layer signaling and a DL control channel from the base station. The terminal may map the SRS to each comb included in the interlace. The terminal may map the SRS and a PUSCH to the same interlace. However, when SRS resource elements occupy subcarriers different from those of the PUSCH within the same interlace, the SRS and the PUSCH may be mapped in a FDM scheme. When DM-RS symbols and data symbols are TDMed, and the DM-RS symbols are located before the data symbols, the PUSCH may have a constant interval in units of subcarriers within the interlace. When the PUSCH is composed of 2 symbols, the DM-RS resources may be FDMed with the data in the same symbol, and when the PUSCH is composed of more than 2 symbols (e.g., 4, 7, or more symbols), the DM-RS resources may be mapped to symbols different from those of the data.

Figure 6:
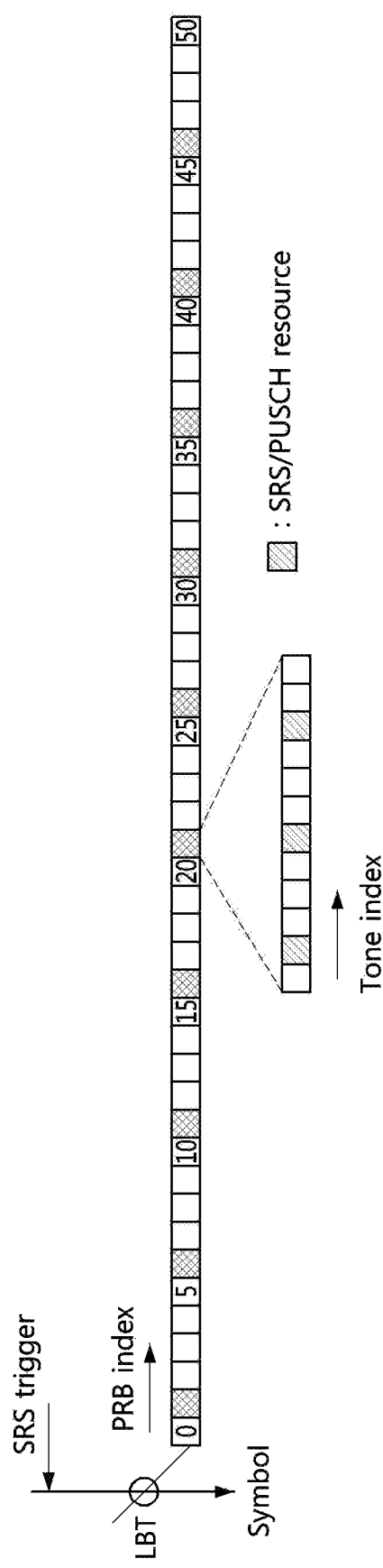
FIG. 6 is a conceptual diagram illustrating a third exemplary embodiment of an SRS resource of the present disclosure.

FIG. 6 is a conceptual diagram illustrating a third exemplary embodiment of an SRS resource of the present disclosure.

Referring to FIG. 6, SRS resource elements according to another exemplary embodiment of the present disclosure and a PUSCH may be mapped in a code division multiplexing (CDM) scheme. The PUSCH may include PUSCH demodulation reference signal (DM-RS) resources for demodulation of the PUSCH and PUSCH data resources for transmission of uplink data. The SRS resource elements and the DM-RS resource elements of the PUSCH may be discretely distributed, and the SRS resource elements and the DM-RS resource elements may be mapped in a CDM scheme.

The terminal performing wireless communication in an unlicensed band may perform an LBT procedure, and transmit a signal according to a result of the LBT procedure. That is, the terminal transmitting an SRS in an unlicensed band may perform an LBT procedure before transmitting the SRS. In addition, the terminal transmitting a PUSCH in an unlicensed band may perform an LBT procedure before transmitting the PUSCH. Accordingly, the terminal may transmit the SRS through resources allocated to the PUSCH. Particularly, the terminal may transmit the SRS through the same resources as the resources allocated to the DM-RS of the PUSCH. A symbol including the resources allocated to the PUSCH DM-RS may be located first among symbols of the PUSCH. Specifically, the terminal may map the SRS resource elements and the resource elements of the PUSCH DM-RS to symbols in a CDM scheme.

According to an exemplary embodiment of the present disclosure, the terminal may generate the SRS resource elements as a complex vector having a constant length of a Zadoff-Chu (ZC) sequence, and map the SRS resource elements to resources having an interlace structure and a comb structure.

When the PUSCH DM-RS resource elements are generated based on the ZC sequence, the interlace structure and the comb structure of the resources to which the SRS resource elements are mapped may be the same as a resource structure to which the resource elements of the PUSCH DM-RS are mapped. In order to use constant amplitude zero auto correlation waveform (CAZAC), which is a property of the ZC sequence, the SRS resource elements may be generated from the same basis sequence as that of the PUSCH DM-RS resource elements. In addition, the SRS resource elements may have a different cyclic shift than that of the PUSCH DM-RS resource elements. Each terminal may generate the SRS and the PUSCH DM-RS using the same ZC sequence and different cyclic shift information. Each terminal may map the generated SRS and PUSCH DM-RS in a CDM scheme. Each terminal may transmit the generated signal to the base station. The base station may divide the signals (i.e., the PUSCH DM-RS and the SRS) received at the same time based on the cyclic shift information.

It may be difficult for the terminal performing communication in an unlicensed band to accurately know the transmission time point of the SRS. When sequence hopping and cyclic shift information of the ZC sequence is dependent on the time information of the SRS resource, the terminal may generate a plurality of SRSs respectively according to the results of the LBT procedures, and consequently, the signal processing time and computation amount of the terminal may increase. Accordingly, the base station may configure the sequence hopping (e.g., group hopping, sequence shift, sequence hopping, etc.) information and/or the cyclic shift information of the ZC sequence independently of the information on the time resource for transmitting the SRS (i.e., slot index or symbol index).

Moreover, according to the conventional technology, the base station may generate a pattern of the SRS resource through the ZC sequence in the entire band of BWPs included in a common resource grid, and then may not map a subsequence of the ZC sequence only for PRBs corresponding to an active BWP. In addition, terminals may generate ZC sequences only for PRBs corresponding to a required bandwidth and map them to SRS resources. Therefore, when the positions of PRBs to be actually used for transmission are misaligned with each other, multiplexing of the ZC sequences (e.g., CDM-based multiplexing) may not be possible.

According to another exemplary embodiment of the present disclosure, the terminal may generate the SRS as a complex vector having a constant length of a PN sequence. The terminal may generate the SRS having an interlace structure and/or a comb structure.

When the PUSCH DM-RS is generated based on the PN sequence, the interlace structures and the comb structures of the PUSCH DM-RS resource and the SRS resource may be identical to each other. The terminal may further apply an orthogonal cover code (OCC) to the PN sequence to generate the PUSCH DM-RS. When the terminal further applies the OCC to the PN sequence to generate the PUSCH DM-RS, the terminal may generate the SRS based on the PN sequence. In addition, the terminal may generate the SRS by further applying an OCC to the SRS.

According to the conventional technology, the terminal may obtain scrambling information from the base station through higher layer signaling, and may initialize the PN sequence using the scrambling information. The terminal may or may not receive at least one scrambling information from the base station. For example, the terminal may generate the PUSCH DM-RS from the PN sequence according to the conventional technical specification (e.g., TS 38.211). The terminal may generate the PUSCH DM-RS by further applying an OCC to the PN sequence according to a CDM group.

According to an exemplary embodiment of the present disclosure, the SRS resource may have a comb structure, and the number k of combs may be 2 or 4. In order to maintain a frequency response of the channel to be similar, the terminal may generate the SRS by applying the OCC in units of a PRB in the interlace belonging to one or more symbols.

The terminal may generate the SRS by applying an OCC having a length of h=12/k (i.e., h=6 when k=2, and h=3 when k=4) in one PRB. When applying the OCC, the terminal may generate the SRS by applying the same PN sequence values to the same OCC. Therefore, the length of the PN sequence may be the same as the number of PRBs belonging to the interlace.

The OCC may be one of non-orthogonal sequences such as a Hadamard sequence or a discrete Fourier transform (DFT) sequence. According to an exemplary embodiment of the present disclosure, when the value of h is not an exponent of 2, the terminal may apply the OCC by applying the DFT sequence. The DFT sequence may consist of indices of an h-th root of unity ($\omega=e^{2\pi i/h}$). Table 1 shows a DFT sequence $\omega=e^{2\pi i/6}$ when h=6, and Table 2 shows a DFT sequence $\omega=e^{2\pi i/3}$ when h=3.

TABLE 1

|   | 0 | 1 | 2 | 3 | 4 | 5 |
|---|---|---|---|---|---|---|
| 0 | $\omega^0$ | $\omega^0$ | $\omega^0$ | $\omega^0$ | $\omega^0$ | $\omega^0$ |
| 1 | $\omega^0$ | $\omega^1$ | $\omega^2$ | $\omega^3$ | $\omega^4$ | $\omega^5$ |
| 2 | $\omega^0$ | $\omega^2$ | $\omega^4$ | $\omega^6$ | $\omega^8$ | $\omega^{10}$ |
| 3 | $\omega^0$ | $\omega^3$ | $\omega^6$ | $\omega^9$ | $\omega^{12}$ | $\omega^{15}$ |
| 4 | $\omega^0$ | $\omega^4$ | $\omega^8$ | $\omega^{12}$ | $\omega^{16}$ | $\omega^{20}$ |
| 5 | $\omega^0$ | $\omega^5$ | $\omega^{10}$ | $\omega^{15}$ | $\omega^{20}$ | $\omega^{25}$ |

TABLE 2

|   | 0 | 1 | 2 |
|---|---|---|---|
| 0 | $\omega^0$ | $\omega^0$ | $\omega^0$ |
| 1 | $\omega^0$ | $\omega^1$ | $\omega^2$ |
| 2 | $\omega^0$ | $\omega^2$ | $\omega^4$ |

The terminal may generate the SRS by applying some OCC indexes (e.g., q indexes, q<h) among h OCC indexes. In order to select q OCC indexes, the terminal may select ∝ satisfying $(\omega^\alpha)^q=1$ in Tables 1 and 2. The column vectors selected by the terminal may have properties of being orthogonal with each other. In addition, the column vectors selected by the terminal may have a constant complex cyclic shift interval according to a q-th root of unity. Accordingly, the terminal may generate the SRS by applying the OCC index even in the frequency selective radio channel.

The base station may transmit scrambling information for initializing the sequence to the terminals. The terminal may initialize the PN sequence using the scrambling information received from the base station. The terminal may generate the SRS by applying the initialized PN sequence.

Then, a separate terminal may initialize the PN sequence using scrambling information received from the base station. The separate terminal may receive the same scrambling information from the base station. The terminal may generate a PUSCH DM-RS by applying the initialized PN sequence.

It may be difficult for the terminal performing communication in an unlicensed band to accurately obtain the transmission time point of the SRS. Accordingly, when the scrambling information of the PN sequence is configured depending on the time resource (e.g., slot or symbol) of the SRS, the terminal may perform an LBT procedure for each of a plurality of SRS symbols. In addition, the terminal may generate the SRS according to the results of the LBT procedures for the respective SRS symbols, so that the processing time and the computation amount of the terminal may increase. Accordingly, according to an exemplary embodiment of the present disclosure, the scrambling information of the PN sequence may be configured independently of information of the time resources occupied by the SRS resource elements (i.e., slot index or symbol index).

Then, the base station may transmit OCC information to the terminal. The base station may transmit different OCC information to different terminals. The terminals may receive the same scrambling information from the base station, and may receive different OCC information. The terminals may generate different signals (e.g., PUSCH DM-RSs or SRSs) based on the received scrambling information and OCC information. Therefore, the SRS may be CDMed with the PUSCH DM-RS. Each terminal may transmit a channel including the generated signal (e.g., PUSCH DM-RS or SRS) to the base station. The base station may receive the channels including the PUSCH DM-RSs and SRSs from the terminals. The base station may obtain the PUSCH DM-RSs and/or SRSs by discriminating the received sequences.

The BWPs occupied by the terminals may partially overlap each other. That is, in the overlapped band (i.e., LBT subband(s)), SRS resources may be multiplexed with each other. In addition, the respective SRS resources may be configured in the same interlace and comb form. The lengths of the sequences for generating the SRS resources may be different, and the respective SRS resources may be mapped in a CDM scheme.

Figure 7:
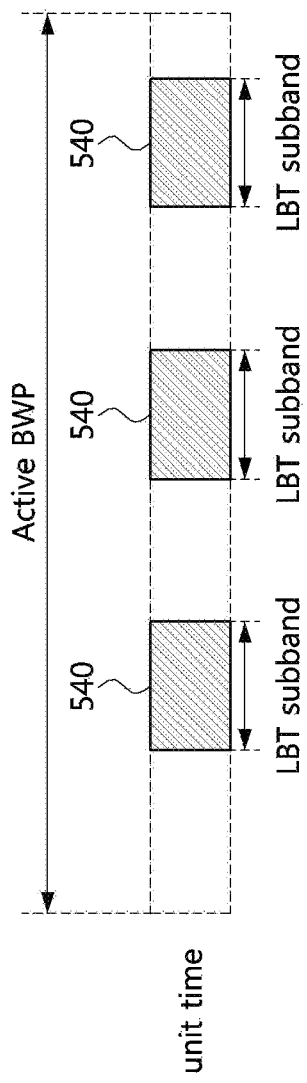
FIG. 7 is a conceptual diagram illustrating an exemplary embodiment of an active bandwidth (BWP) and an LBT subband of radio resources.

FIG. 7 is a conceptual diagram illustrating an exemplary embodiment of an active bandwidth (BWP) and an LBT subband of radio resources.

Referring to FIG. 7, SRS resources may be multiplexed in radio resources. Terminals may occupy active BWPs having different bandwidths. The bandwidth of the active BWP may be an integer multiple of the bandwidth of the LBT subband. The terminal may perform an LBT procedure for each LBT subband. Therefore, the bandwidth of the band for transmitting the SRS may be an integer multiple of the bandwidth of the LBT subband. The BWPs of the LBT subbands occupied by the respective terminals may have different center frequencies.

According to an exemplary embodiment of the present disclosure, the terminal may separately generate an SRS as a unit corresponding to the LBT subband. When the terminal secures frequency resources corresponding to one LBT subband by using the LBT procedure, the terminal may generate an SRS sequence having a length corresponding to the secured LBT subband. The terminal may map the generated SRS sequence to the common resource group based on the reference point (e.g., reference point A) of the LBT subband.

When the terminal secures frequency resources corresponding to two or more LBT subbands by using the LBT procedures, the terminal may generate SRS sequences each of which has a length corresponding to each of the secured LBT subbands. The terminal may map the generated SRS sequences for the respective LBT subbands to the common resource grid based on the reference point (e.g., reference point A).

Each of the LBT subbands may be contiguously arranged. The contiguous LBT subbands may include contiguous PRBs. Specifically, when the terminal secures only one LBT subband by the LBT procedure and transmits the SRS, the LBT subband may include PRBs to which the SRS is mapped and PRBs to which the SRS is not mapped (i.e., PRBs belonging to the boundaries of the LBT subbands). The boundary of the LBT subband may be composed of a predetermined number of PRBs. The terminal may not map the SRS to the PRBs included in the boundary of the LBT subband according to the result of performing the LBT procedure. However, when the terminal secures two adjacent LBT subbands, the terminal may map the SRS to the PRBs included in the boundary of the LBT subbands.

The base station may configure a BWP to the terminal through higher layer signaling. However, if the bandwidth of the BWP is at least twice that of the LBT subband, the base station may indicate the boundary of the LBT subbands to the terminal in units of PRBs. The terminal may use the LBT subband(s) for the active BWP according to the result of the LBT procedure performed before UL transmission. The base station may indicate the boundary of the LBT subbands for each BWP to the terminal through higher layer signaling. In transmitting the SRS or PUSCH, the terminal may transmit a UL signal and/or channel by using PRBs belonging to the boundary of the LBT subbands.

According to another exemplary embodiment of the present disclosure, the terminal may map the sequence to from a reference point (i.e., reference point A) of an LBT subband having the lower center frequency among two LBT subbands forming a boundary to PRBs forming the boundary, by including the PRBs forming the boundary from the corresponding LBT subband. Accordingly, the terminal may map a relatively long sequence to the LBT subband having a relatively low center frequency among two LBT subbands, and a relatively short sequence to the LBT subband having a relatively high center frequency. The difference in the lengths of the respective sequences may be derived based on the number of PRBs forming the boundary.

SRS Mapping Method for SRS Resource

Exemplary embodiments of SRS mapping for SRS resource may be as described below. The SRS resource may include one interlace or some combs or transmission combs included in one interlace. The terminal may sequentially map the SRS to subcarriers. However, since the SRS resource may also be composed of two or more interlaces, a mapping method that can be applied regardless of the number of interlaces is needed.

FIG. 8 is a conceptual diagram illustrating a first exemplary embodiment of an SRS mapping method for SRS resource.

Referring to FIG. 8, according to an exemplary embodiment of the present disclosure, the terminal may sequentially map the SRS to the subcarriers. That is, even when an SRS symbol includes multiple interlaces, the terminal may map the SRS in the order of subcarriers of the SRS resource. The terminal may map the SRS alternately to different interlaces. Therefore, the SRS of the terminal may not be multiplexed (e.g., CDMed) with a signal (e.g., PUSCH DM-RS) of another terminal using only one interlace. When the same sequence is not mapped in a common interlace, the base station may not distinguish received different signals (e.g., SRS or PUSCH DM-RS).

FIG. 9 is a conceptual diagram illustrating a second exemplary embodiment of an SRS mapping method for SRS resources.

Referring to FIG. 9, according to another exemplary embodiment of the present disclosure, a plurality of interlaces included in the SRS resource may have priorities among the interlaces. The terminal may map the SRS to the SRS resource based on the priorities of the plurality of interlaces. For example, the terminal may preferentially map the SRS to subcarriers belonging to the high priority interlace, and may additionally map the SRS to subcarriers belonging to the low priority interlace.

FIG. 10 is a conceptual diagram illustrating a third exemplary embodiment of an SRS mapping method for SRS resources.

Referring to FIG. 10, according to another exemplary embodiment of the present disclosure, different terminals may acquire resources (e.g., SRS resources) including different numbers of interlaces. Each terminal may initialize a sequence for each interlace. Each terminal may map resource elements generated based on the same sequence to the resource in a common interlace. Each terminal may transmit the SRS to the base station. The base station may receive the SRSs from the terminals, and the base station may distinguish different SRSs received from the different terminals.

Frequency Resource for SRS Transmission

The terminal may obtain information on at least one LBT subband from the base station. The terminal may perform the LBT operation on the obtained at least one LBT subband. The terminal may map the SRS to the SRS resource of the LBT subband in which the LBT operation is successful among the at least one LBT subband. The terminal may transmit the SRS mapped to the SRS resource (e.g., interlace or comb) to the base station.

When the SRS resource includes two or more symbols, the terminal may perform an LBT procedure for each symbol. When the SRS is not transmitted because the LBT operation fails in some of the LBT subband(s) included in one symbol, the terminal may perform an LBT procedure for the next symbol. As a result of the LBT operation, if the terminal can use the LBT subband(s) that was not accessible in the previous symbol, the LBT subband(s) that the terminal uses in the corresponding symbol may increase. Therefore, the bandwidth of the SRS symbol transmitted in the (n+1)-th symbol may be equal to or larger than the bandwidth of the SRS symbol transmitted in the n-th symbol (here, n=0, 1, . . . ). When the terminal maps the SRS in adjacent LBT subbands, the terminal may map the SRS to PRBs belonging to a guard band.

SRS Transmission Method Through Frequency Hopping

Figure 11:
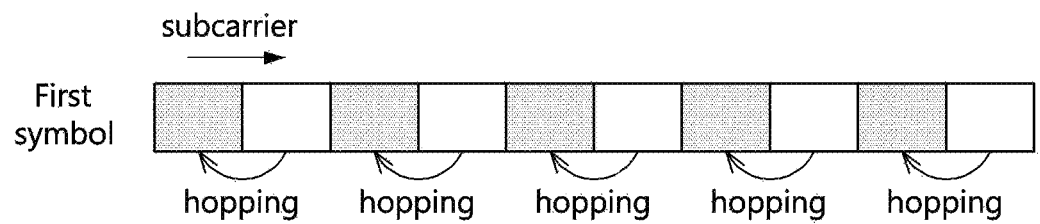
FIG. 11 is a conceptual diagram illustrating an exemplary embodiment of a frequency resource occupied as an SRS resource.

FIG. 11 is a conceptual diagram illustrating an exemplary embodiment of a frequency resource occupied as an SRS resource.

Referring to FIG. 11, subcarriers of an SRS resource may be configured in a comb structure included in the entire band. The SRS may be instructed to transmit in a narrow band, and when the base station triggers, the position of the band in which the SRS is transmitted may be changed by an index (or SRS counter) that the terminal has. When the base station triggers the SRS transmission of the terminal at least once, the SRS may be transmitted at least once for each of all positions in the band. Therefore, the base station may know all frequency response values of the BWP of the terminal. However, in an unlicensed band, since the SRS resource is not defined as a narrow band but is defined on an interlace basis and uses a frequency resource corresponding to a wide band to satisfy the frequency regulation, it may be difficult to apply the conventional scheme as it is.

According to an exemplary embodiment of the present disclosure, the terminal may map the SRS to radio resources by hopping in units of an interlace. When a subcarrier spacing by which the SRS is transmitted is 15 kHz, one LBT subband may include 10 interlaces. Therefore, the base station may configure one SRS resource to the terminal and may trigger the SRS 10 times. The terminal may transmit the SRS through a different interlace each time, so the base station may estimate the channel based on all the interlaces belonging to the LBT subband. Since the SRS resource may occupy a comb-shaped frequency resource as well as the interlace, the base station may not be able to estimate the channels of all subcarriers belonging to the LBT subband. The terminal may map the SRS by hopping the interlace of the SRS resource, and may not map the SRS by hopping the comb. The combs adjacent to each other may be divided into at least one or more subcarriers (e.g., two or four), and accordingly, the comb may be configured to be smaller than the channel's correlation bandwidth.

Time Resource for SRS Transmission

Figure 12:
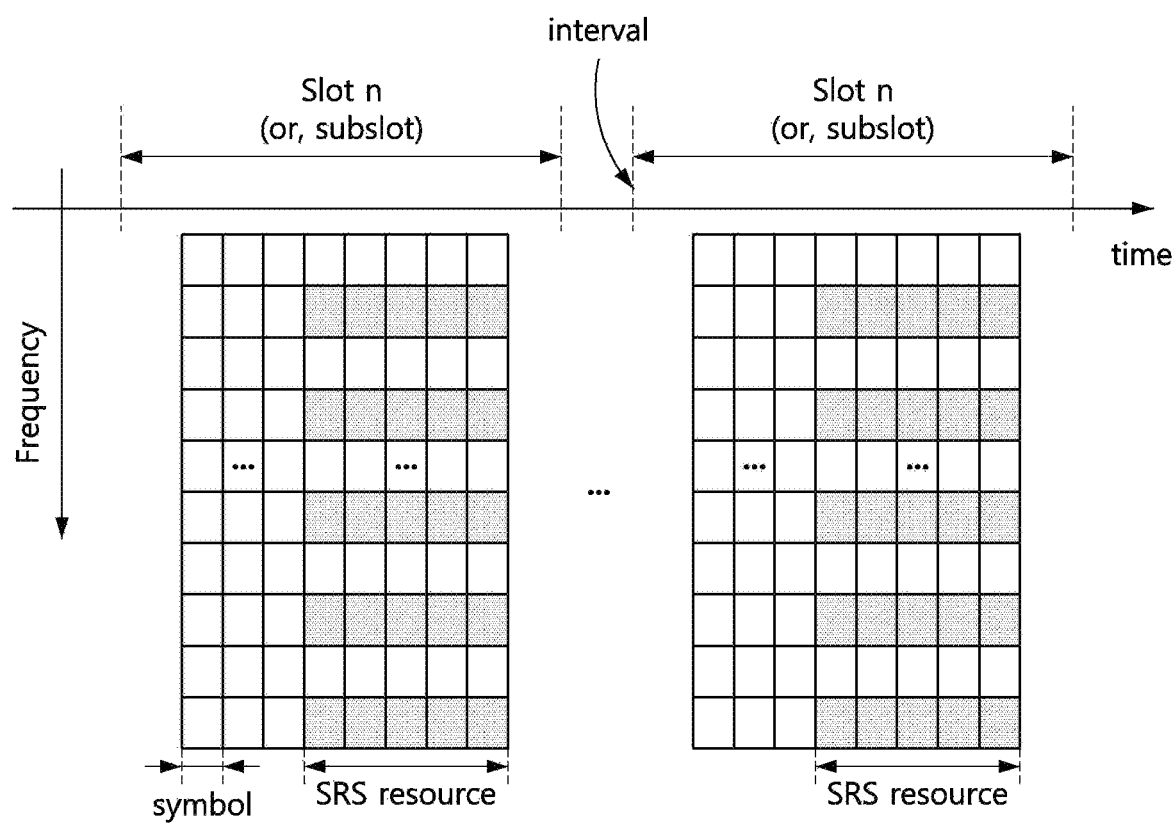
FIG. 12 is a conceptual diagram illustrating an exemplary embodiment of a time resource occupied as an SRS resource.

FIG. 12 is a conceptual diagram illustrating an exemplary embodiment of a time resource occupied as an SRS resource.

Referring to FIG. 12, an SRS resource may be mapped in the last symbol(s) of a subframe or slot. However, in an unlicensed band, since the terminal transmits the SRS according to the LBT operation result, after the terminals perform contention in a UL resource, only one terminal may transmit a UL signal and/or channel through the UL resource, or a plurality of terminals may transmit UL signals and/or channels in a FDM or CDM scheme. Therefore, the SRS may be FDMed or CDMed with a PUSCH. Also, the first symbol belonging to the SRS resource may be the same symbol as the first symbol belonging to the PUSCH. In addition, the first symbol of the PUSCH may include DM-RS resources, and the SRS may be mapped to the starting symbol of the PUSCH. The first symbol of the PUSCH may be an arbitrary symbol not limited to the first or last symbol of the slot, and thus the first symbol of the SRS resource may be an arbitrary symbol of the slot In order to transmit the SRS, the terminal may perform the LBT procedure. When transmitting the SRS through a time resource (e.g., channel occupancy time (COT)) allocated from the base station, the terminal may perform a short LBT (e.g., category 2 LBT). On the other hand, when the terminal transmits the SRS through a time resource (e.g., COT) secured by itself, the terminal may perform a long LBT (e.g., a category 3 or 4 LBT). Since SRS symbol index(es) of the SRS resource located within the subframe or slot may be fixed, the base station may transmit a DL control channel triggering only the first subframe or slot in form of an index, where the LBT procedure is started for transmitting information on the SRS resource.

The PUSCH may occupy a time resource having a shorter unit (e.g., minislot or subslot) than a subframe or a slot. Therefore, the terminal may transmit the SRS through the SRS resource when the symbol index of the SRS resource is obtained.

The base station may transmit DCI including a trigger signal to the terminal. The trigger signal may include index information indicating the position of the SRS resource. The index information of the trigger signal may indicate a time resource for SRS transmission. Specifically, the index information of the SRS resource may include all resources (e.g., time, frequency, sequence, precoding information or preprocessing information) for transmitting the SRS. The trigger signal may transfer sufficient information by indicating only the index of the SRS resource. Therefore, the size of the trigger signal can be reduced. On the other hand, since all resources of the SRS resource are configured as the index, the size of higher layer signaling (e.g., RRC message) may increase.

The terminal may receive the trigger signal from the base station. The terminal may obtain information on the time resource for transmitting the SRS from the received trigger signal. The terminal may perform the LBT procedure from the time indicated by the trigger signal. The terminal may transmit the SRS through the first time resource among the resources where the LBT operation is successful.

When the SRS resource includes two or more symbols, the first symbol of the SRS resource may be an arbitrary symbol belonging to a slot. Therefore, according to the result of the LBT procedure, the last symbol of the SRS resource may belong to a different slot from the slot to which the first symbol of the SRS resource belongs. When one SRS resource is transmitted through multiple slots, scheduling and interference environments experienced by the serving base station in the respective slots may be different from each other. Therefore, it may be preferable for one SRS resource to belong to only one slot. Therefore, when the terminal transmits the SRS resource, the terminal may transmit from the first symbol belonging to the SRS resource, but may omit a transmission procedure for a symbol that crosses the boundary of the corresponding slot.

The terminal may receive the trigger signal through the n-th slot. In addition, the terminal may sequentially perform the LBT procedure from the (n+u)-th slot after a slot offset u. The terminal may transmit the SRS by performing the LBT procedure in a symbol (i.e., the symbol t1 in the slot n+u) at the earliest time point among the candidate symbols belonging to the (n+u)-th slot. When the LBT procedure is unsuccessful in all the candidate symbols belonging to the (n+u)-th slot (e.g., all symbols belonging to the slot), the terminal may not transmit the SRS through the corresponding slot. In an exemplary embodiment, the terminal may no longer transmit the SRS. In another exemplary embodiment, the terminal may perform the same operation in a subsequent slot (i.e., slot n+u+1).

According to an exemplary embodiment, higher layer signaling may indicate the slot offset for transmitting the SRS. According to another exemplary embodiment, the higher layer signaling may indicate the slot offset for transmitting the SRS and a symbol index or the first symbol t1 transmitted according to the SRS resource. When the higher layer signaling does not separately indicate the first symbol transmitted according to the SRS resource, the terminal may perform the LBT procedure from the first symbol (i.e., t1=0) of the slot n+u to transmit the SRS.

In case of the NR system, the base station may transmit the trigger signal to a plurality of unspecified terminals in a DCI format 2_3. In addition, each of the unspecified terminals may identify information on a slot for transmitting the SRS according to higher layer signaling. Since the position indicated by the higher layer signaling is known, each of the terminals may obtain an SRS trigger index based on information of the DCI format 2_3. The terminal may derive the slot for the transmitting the SRS based on the slot offset u, and may perform the LBT procedure from the first symbol of the derived slot. According to an exemplary embodiment of the present disclosure, the index of the trigger signal may indicate the slot offset and/or candidate symbols t1, t2, t3, . . . , or tT. The index of the trigger signal may indicate encoded information on the slot offset and the candidate symbols. For example, the slot offset and the number of slots may be indicated to the terminal using one index, and the candidate symbols may be configured to the terminal by higher layer signaling.

Although only one candidate set may be known to the terminal, when multiple candidate sets are known to the terminal, the terminal may obtain information on the candidate set indicated by the index of the trigger signal. According to yet another exemplary embodiment, the candidate slots may be indicated by higher layer signaling, and the slot offset may be indicated by the trigger signal.

The terminal may receive the trigger signal through the n-th slot. In addition, the terminal may sequentially perform the LBT procedure for the candidate symbols included in the (n+u)-th slot after the slot offset u. The terminal may transmit the SRS through the symbol at the earliest time point (i.e., symbol t1 in the slot (n+u)) where the LBT procedure is successful among the candidate symbols. When the LBT procedure is not successful in all the candidate symbols belonging to the (n+u)-th slot (i.e., symbols t1, t2, . . . , tT in the slot (n+u)), the terminal may not transmit the SRS through the corresponding slot.

According to another exemplary embodiment of the present disclosure, the index of the trigger signal may indicate the slot offset u and/or a symbol offset t. The index of the trigger signal may indicate encoded information on the slot offset and the symbol offset. For example, the slot offset and the number of slots may be indicated to the terminal using one index. According to an exemplary embodiment, the candidate symbols may be indicated through the index of the trigger signal and a separate indicator. According to another exemplary embodiment, the index of the trigger signal may indicate all of the slot offset, the number of slots, and the symbol offset. Alternatively, the slot offset and the number of slots may be indicated by the trigger signal, and the symbol offset may be configured by higher layer signaling. According to yet another exemplary embodiment, the symbol offset may be indicated by higher layer signaling, and the slot offset may be indicated by the trigger signal.

The terminal may identify whether the SRS can be transmitted in the symbol t in the slot (n+u) occurring after the slot offset u from the slot n in which the trigger signal has been received by sequentially performing the LBT procedure, and transmit the SRS. According to an exemplary embodiment of the present disclosure, when the LBT procedure is not successful in the corresponding candidate symbol belonging to the corresponding slot, the terminal may not transmit the SRS. The terminal may perform the LBT procedure in the next slot (n+u+1). According to an exemplary embodiment of the present disclosure, the terminal may perform the LBT procedure in the candidate symbols (i.e., symbols t1, t2, . . . , tT) belonging to the corresponding slot (i.e., slot (n+u)), and may not transmit the SRS in the subsequent slots.

According to another exemplary embodiment of the present disclosure, the index of the trigger signal may indicate the candidate slots (n1, n2, . . . , nw) and/or the symbol offset t.

The information on the candidate set of slots and the information on the symbol offset may be encoded together and included in the trigger signal in form of an index. For example, when only one candidate set of slots is configured to the terminal by higher layer signaling, there is no need to indicate that to the terminal by including that in the trigger signal, but when two or more candidate sets are configured for the terminal, the trigger signal may include an index so that the terminal can identify one candidate set. The symbol offset may be indicated by the index to the terminal together with the candidate slots, and the terminal may derive both the candidate slots and the symbol offset from the one index. Alternatively, the information on the candidate set of slots may be indicated by the trigger signal, and the information on the symbol offset may be indicated through higher layer signaling.

The terminal may identify whether the SRS can be transmitted from the symbol (i.e., symbol t) to which the symbol offset is applied in a slot (i.e., slot n1) occurring after the slot n in which the trigger signal is received by sequentially performing the LBT procedure. When the LBT procedure is not successful in the corresponding candidate symbol belonging to the corresponding slot, the terminal may not transmit the SRS. When the LBT procedure fails in all the symbols included in the corresponding slot, the terminal may perform the LBT procedure in the first symbol (i.e., symbol t) included in the next slot (i.e., slot n2). When the LBT procedure is unsuccessful even in the last position of the candidate symbols (i.e., symbol t) of the slot nw, the terminal may not transmit the SRS.

According to another exemplary embodiment of the present disclosure, the index of the trigger signal may indicate the candidate slots (n1, n2, . . . , nw) and/or the candidate symbols (t1, t2, t3, . . . , tT).

In this case, information of them may be partially encoded and included in the trigger signal in form of an index. For example, the candidate set of slots may be indicated to the terminal using one index, and the candidate set of symbols may be configured to the terminal by higher layer signaling. Alternatively, one index may indicate not only the candidate set of slots but also the candidate set of symbols to the terminal.

The terminal may identify whether the SRS can be transmitted from the candidate symbol (i.e., symbol t1) in the slot (i.e., slot n1) occurring after the slot n in which the trigger signal is received by sequentially performing the LBT procedure, and transmit the SRS. When the LBT procedure is not successful in the corresponding candidate symbol belonging to the corresponding slot, the terminal may determine whether the SRS can be transmitted by performing the LBT procedure in the next symbol (i.e., symbol t2). When the LBT procedure is unsuccessful in all the symbols included in the corresponding slot, the terminal may perform the LBT procedure from the first candidate symbol (i.e., symbol t1) included in the next slot (i.e., slot n2). When the LBT procedure is unsuccessful even in the last position (i.e., symbol tT) of the candidate symbols in the slot nw, the terminal may not transmit the SRS.

Configuration in which SRS and PUSCH/PUCCH are TDMed

The base station may trigger SRS transmission of the terminal by transmitting DCI including a trigger signal. The DCI may be DL-DCI for assigning a PDSCH, or UL-DCI for assigning a PUSCH. The SRS may be transmitted through resources (e.g., symbol, etc.) different from those of the PUSCH of a physical uplink control channel (PUCCH).

Figure 13:
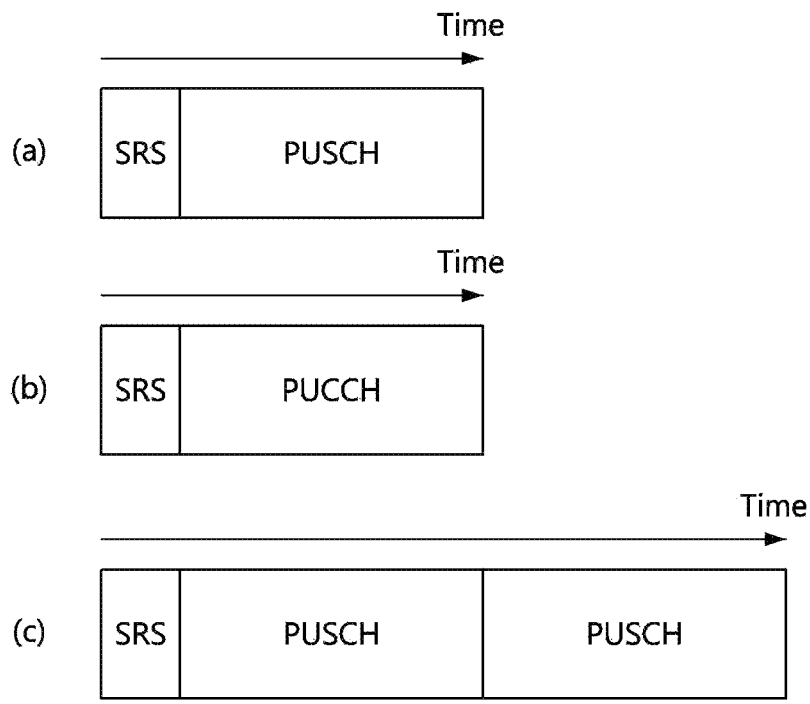
FIG. 13 is a conceptual diagram illustrating a first exemplary embodiment of an arrangement of an uplink channel and an SRS resource.

FIG. 13 is a conceptual diagram illustrating a first exemplary embodiment of an arrangement of an uplink channel and an SRS resource.

Referring to FIG. 13, the base station may trigger the SRS transmission of the terminal through DCI (i.e., DL-DCI or UL-DCI). When the SRS transmission is triggered by the DCI, the DCI may include information on an SRS resource and resource(s) of UL channel(s) (i.e., PUSCH and/or PUCCH). The SRS resource and the UL channel resource may be arranged adjacently in time.

The DCI may include information on the starting symbol of the SRS resource. In addition, the DCI may include information on the starting symbol of the UL channel resource. When the SRS resource and the UL channel resource are not disposed in contiguous with each other, the base station may indicate the starting symbol of each resource (e.g., SRS resource, or PUSCH and/or PUCCH) through a different field of the DCI. When the SRS resource is arranged in contiguous with the UL channel resource, the base station may indicate only the starting symbol of the SRS resource or the UL channel resource to the terminal through the DCI. The base station may transmit the DCI including the information on the SRS resource to the terminal. The DCI assigning the UL channel may further indicate a category of an LBT procedure as well as the starting time resource of the UL channel. The terminal may derive the starting time resource of the UL channel and the category of the LBT procedure based on the index configured by the higher layer signaling. For example, in the case of the NR system, a specific field of the DCI may indicate an index value, and the index indicated by the DCI may indicate the type of LBT procedure and an extended length of a cyclic prefix (CP). The extended length of the CP may be one of four values. For example, the index indicated by the DCI may indicate one of 0 (e.g., case where the CP to be applied to the UL channel is not extended), a value obtained by subtracting 25 μs from the length of C1 symbols, a value obtained by subtracting (16 μs+timging advance (TA)) from the length of C2 symbols, and a value obtained by subtracting (25 μs+TA) from the length of C3 symbols. The value of C1 indicated by the index may be a value determined according to a subcarrier spacing of the UL channel, and the values of C2 and C3 may be values given to the terminal by higher layer signaling. The terminal may transmit the first symbol constituting the UL channel by extending the CP of the first symbol by the value indicated by the index. The terminal may receive the DCI from the base station. The terminal may obtain information on each resource (e.g., SRS resource, PUCCH and/or PUSCH resource) from the received DCI. The terminal may map resource elements to each resource based on the obtained resource information. The terminal may transmit the SRS and/or PUCCH/PUSCH to the base station.

Meanwhile, when two or more PUSCHs are assigned, a configuration scheme in which the SRS is TDMed between the PUSCHs may be proposed. However, a transmission power of the SRS and a transmission power of the PUSCH may be different from each other. Accordingly, the PUSCH and the SRS may be mapped in a TDM scheme, and the PUSCHs may be sequentially arranged.

According to an exemplary embodiment of the present disclosure, the terminal may transmit the PUSCH and/or PUCCH after transmitting the SRS. The base station may transmit DCI including information on the starting symbol of the SRS resource to the terminal. The terminal receiving the DCI from the base station may obtain information on the starting symbol of the SRS resource. In case of the PUSCH, a start and length indicator value (SLIV) of the PUSCH may be generated such that the PUSCH is allocated in succession to the last symbol of the SRS resource. In case of the PUCCH, the resource index of the PUCCH may be generated such that the PUCCH is allocated in succession to the last symbol of the SRS resource.

Alternatively, the terminal may know the starting symbol of the PUSCH and/or PUCCH from the SLIV of the PUSCH (or a resource index of the corresponding PUCCH). Therefore, the terminal may map the SRS to resources located earlier by the number of symbols of the SRS resource.

When the SRS resource is disposed before the PUSCH/PUCCH resource, the terminal may not be able to transmit the SRS according to the LBT procedure. When the SRS resource is disposed before the PUSCH/PUCCH resource, a transmission probability of the SRS of the terminal may be relatively lower, and a transmission probability of the PUSCH/PUCCH thereof may be relatively higher than the transmission probability of the SRS. Therefore, when the priority of the PUSCH PUCCH is higher than the priority of the SRS transmission, the terminal may increase the transmission probability of the PUSCH/PUCCH by preferentially arranging the SRS in radio resources. If one UL-DCI indicates a plurality of PUSCH resources, the SRS resource may be arranged prior to the plurality of PUSCH resources.

Figure 14:
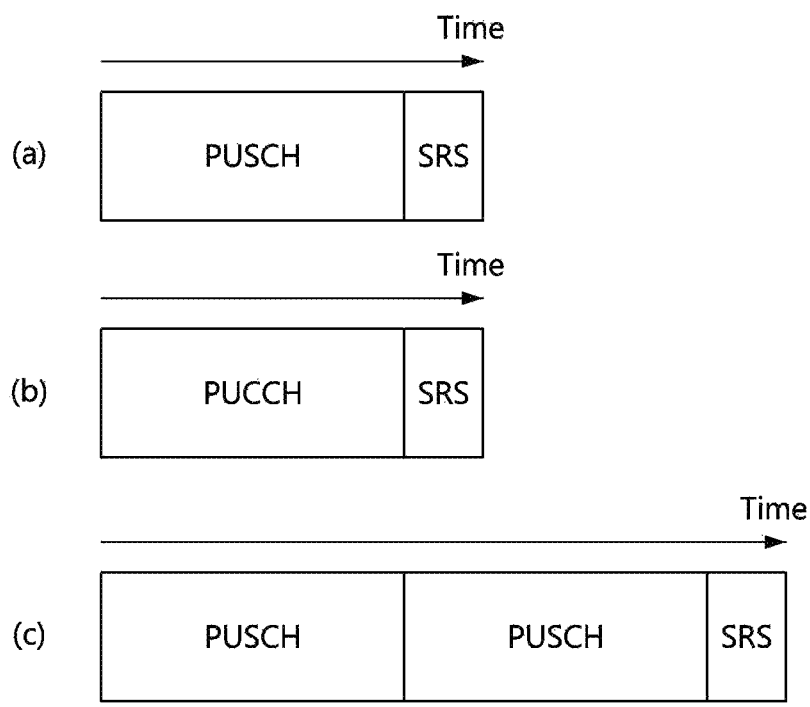
FIG. 14 is a conceptual diagram illustrating a second exemplary embodiment of an arrangement of an uplink channel and an SRS resource.

FIG. 14 is a conceptual diagram illustrating a second exemplary embodiment of an arrangement of an uplink channel and an SRS resource.

Referring to FIG. 14, according to another exemplary embodiment of the present disclosure, the terminal may transmit the SRS after transmitting the PUSCH and/or PUCCH. The terminal may map the SRS to resources contiguous to the last symbol of the PUSCH resource indicated by the SLIV of the PUSCH. The base station may not indicate the position of the starting symbol of the SRS resource to the terminal through the UL-DCI.

The base station may receive the SRS from the terminal. The base station may estimate the UL channel with the terminal based on the SRS received from the terminals. In addition, the base station may determine a coding rate and a modulation rate of the PUSCH using the estimated UL channel. Therefore, the later the terminal transmits the SRS, the less the change of the UL channel due to fading may be. According to a configuration scheme in which the SRS resource is arranged after the PUSCH resource, the base station may estimate a response of the UL channel with the terminal relatively more accurately. However, according to the LBT procedure, the probability of transmitting the PUSCH may be relatively lower than the probability of transmitting the SRS. Therefore, it may be preferable for the base station to secure a quality (i.e., quality of service (QoS)) of a UL-SCH arranged before the SRS through a retransmission procedure. When one UL-DCI allocates a plurality of PUSCH resources, the SRS resource may be arranged after the plurality of PUSCH resources.

According to the result of the LBT procedure, the terminal may not transmit the UL channel (i.e., PUSCH and/or PUCCH). When the terminal fails to transmit the UL channel, the terminal may perform the LBT procedure in the next symbol of the last symbol constituting the UL channel According to an exemplary embodiment, when the terminal fails to transmit the SRS through a time resource indicated for the SRS transmission as a result of performing the LBT procedure, the terminal may not transmit the SRS. According to another exemplary embodiment, even when the SRS is not transmitted through the time resource indicated for the SRS transmission as the result of performing the LBT procedure, the terminal may perform the LBT procedure again in the next symbol. The terminal may repeatedly perform the LBT procedure in the remaining symbols belonging to the same slot, and the terminal may transmit the SRS from the first symbol in which the LBT procedure is successful.

According to an exemplary embodiment, when the terminal fails to transmit the UL channel according to the LBT procedure, the terminal may apply the extended length of the CP applied to the UL channel to the SRS resource as it is. That is, the terminal may apply the extended length of the CP indicated by the DCI to the first symbol constituting the SRS resource. According to another exemplary embodiment, when the terminal fails to transmit the UL channel according to the LBT procedure, the terminal may apply the extended length of the CP applied to the UL channel to each symbol belonging to the SRS resource as it is. That is, the terminal may apply the extended length of the CP indicated by the DCI in the first symbol transmitted by the LBT procedure among symbols belonging to the SRS resource.

Figure 15:
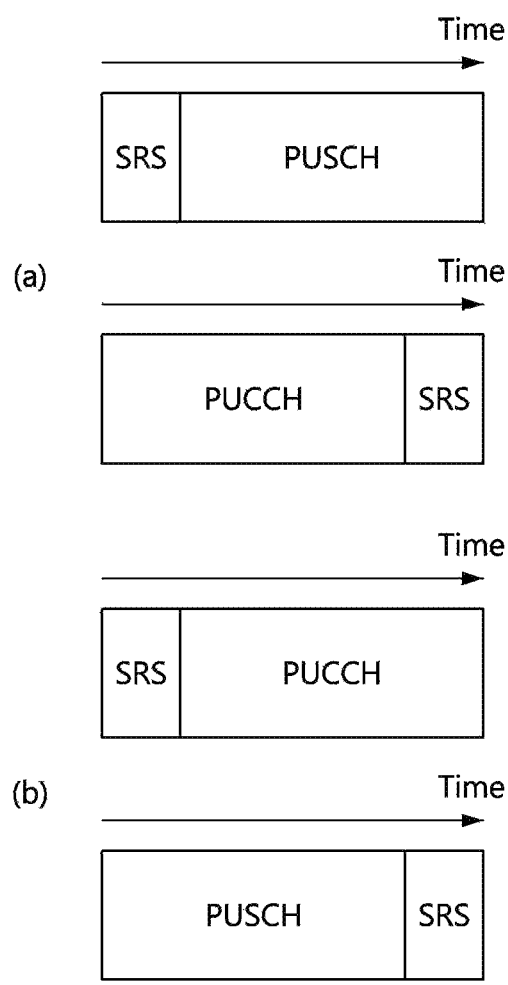
FIG. 15 is a conceptual diagram illustrating a third exemplary embodiment of an arrangement of an uplink channel and an SRS resource.

FIG. 15 is a conceptual diagram illustrating a third exemplary embodiment of an arrangement of an uplink channel and an SRS resource.

Referring to FIG. 15, an SRS resource of a PUSCH according to another exemplary embodiment of the present disclosure may be arranged differently from a PUCCH resource.

The base station may transmit DL-DCI and/or UL-DCI to the terminal. The terminal may receive the DL-DCI and/or the UL-DCI from the base station. The terminal may multiplex an SRS resource triggered by the DL-DCI and an SRS resource trigged by the UL-DCI by distinguishing a time resource to which the SRS triggered by the DL-DCI and a time resource to which the SRS triggered by the UL-DCI. According to another exemplary embodiment of the present disclosure, the SRS resource of the PUSCH may be arranged after the PUSCH, and the SRS resource of the PUCCH may be arranged before the PUCCH. On the other hand, the SRS resource of the PUSCH may be arranged before the PUSCH, and the SRS resource of the PUCCH may be arranged after the PUCCH.

According to the characteristics of the LBT procedure, the probability that the resource arranged earlier in time is transmitted to the base station may be low, and the probability that the resource arranged subsequently is transmitted to the base station may be relatively high. Also, considering the fading of the UL channel, a response of the UL channel estimated by the base station may be more accurate when arranged later in time. Therefore, a communication node (e.g., base station and/or terminal) may preconfigure the priority between the PUCCH and the SRS, and may preconfigure the priority between the PUSCH and the SRS.

For example, the PUCCH may have a higher priority than the SRS. The reason is that if the PUCCH is not transmitted, the base station should transmit the DL-DCI and PDSCH again by performing the LBT procedure, and the terminal also should transmit the PUCCH by performing the LBT procedure. However, since only the SRS resource can be triggered even by the DL-DCI or UL-DCI, the radio resources occupied by the base station or the terminal may be smaller. In addition, the SRS is a reference signal for estimating the UL channel, and may not be used to transmit or retransmit DL data. In addition, a sufficiently low coding rate and modulation rate may be applied to the PUCCH so that the PUCCH can be transmitted robustly even in the fading of the UL channel. Therefore, in order to further increase the transmission probability of the PUCCH, the SRS resource may be arranged prior to the PUCCH resource.

For example, the PUSCH may have a lower priority than the SRS resource. In order to retransmit the PUSCH, the base station may dynamically determine the coding rate and modulation rate thereof based on the fading of the UL channel. Therefore, for accurate UL channel measurement of the base station, the SRS resource may be arranged at the ending portion of the PUSCH.

Time Resource when Two or More Symbols Constitute One SRS Resource

Figure 16:
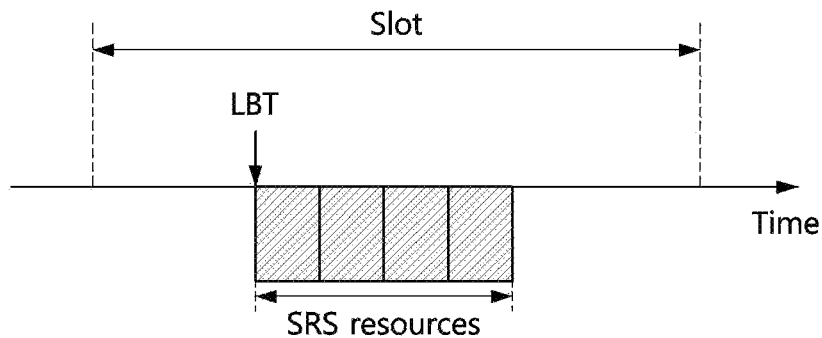
FIG. 16 is a conceptual diagram illustrating a first exemplary embodiment of an SRS resource configuration including at least one symbol.

FIG. 16 is a conceptual diagram illustrating a first exemplary embodiment of an SRS resource configuration including at least one symbol.

Referring to FIG. 16, one SRS resource may include at least one SRS symbol. When the terminal uses a plurality of antenna ports to transmit the SRS, the terminal may transmit one SRS symbol through one antenna port. The terminal may acquire the SRS resource from consecutive symbols as many as the number of SRS antenna ports. The terminal may acquire at least one SRS resource arranged contiguously for beam management. When the number of antennas of the terminal is different from the number of SRS antenna ports of the SRS resources, the terminal may transmit the SRS by using at least one symbol through an antenna switching scheme. When the terminal additionally performs the LBT procedure in an unlicensed band, the time resource of the SRS resource including at least one symbol may be expressed in units of resources, and specifically, in units of symbols.

According to an exemplary embodiment of the present disclosure, when the LBT procedure is successful in the first symbol of the SRS resource, the terminal may transmit the SRS by mapping the SRS to the time resource in which the LBT procedure is successful.

The terminal may transmit the SRS through the first symbol of the SRS resource in order to transmit the SRS semi-statically, periodically, or by being triggered by DCI. Even when the SRS resource is composed of two or more SRS symbols, the terminal may obtain information on the time resource for SRS transmission based on the DCI received from the base station. The terminal may map the SRS to the resource indicated by the obtained time resource information.

When the base station indicates a plurality of time resources, the terminal may perform an LBT procedure for each time resource. As a result of performing the LBT procedure, the terminal may transmit the SRS through a time resource that can be transmitted first among the time resources. The terminal may transmit all symbols constituting the SRS or may not transmit all the symbols constituting the SRS. Accordingly, an imbalance problem between antenna ports, in which channel tracking is possible only in some antenna ports, may not occur. Also, the LBT procedure of the terminal for transmitting a PUSCH may be the same as the LBT procedure for transmitting the SRS of the terminal.

According to an exemplary embodiment of the present disclosure, the terminal may perform the LBT procedure in the next time resource to transmit the SRS. According to the LBT procedure, the terminal may transmit all the symbols constituting the SRS or may not transmit all the symbols. When the LBT procedure is unsuccessful in the first symbol constituting the SRS resource, the terminal may perform the LBT procedure again in the next allowed time resource. The allowed time resource may be a specific symbol index in the next slot (e.g., the index of the first symbol of the SRS resource), or may be the first symbol of the next slot.

Figure 17:
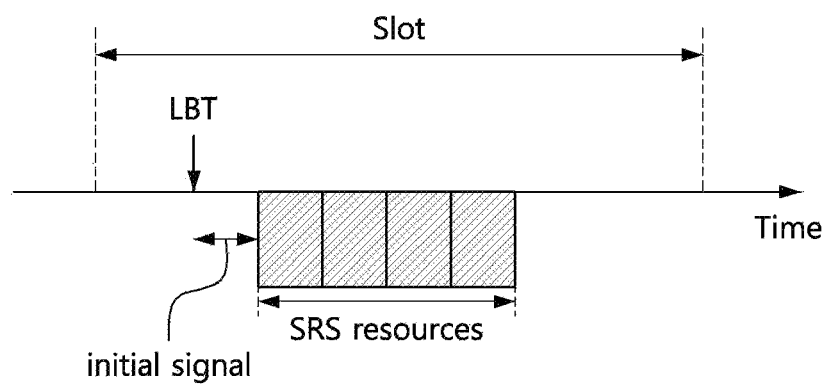
FIG. 17 is a conceptual diagram illustrating a second exemplary embodiment of an SRS resource configuration including at least one symbol.

FIG. 17 is a conceptual diagram illustrating a second exemplary embodiment of an SRS resource configuration including at least one symbol.

Referring to FIG. 17, according to an exemplary embodiment of the present disclosure, the terminal may transmit an initial signal through the first symbol of the SRS determined to be transmitted. The terminal may perform the LBT procedure in the LBT subband(s) to be used for transmitting the SRS by applying CWS and N. The channel acquisition time point of the terminal may be earlier by T (e.g., tens of ns) than the first symbol of the SRS. When the channel acquisition time point is ahead of the transmission time point of the first symbol of the SRS, the terminal may transmit the initial signal for a time equal to or less than T.

If the terminal does not transmit any signal during T, another communication node (e.g., terminal or base station) may transmit a signal. Therefore, the terminal may not be able to transmit the SRS due to signal transmission from another communication node. Accordingly, the terminal may transmit the initial signal at a time point when a transmission opportunity is acquired, thereby preventing resource occupancy of another communication node. The initial signal for the SRS may be obtained from the first symbol constituting the SRS.

According to an exemplary embodiment of the present disclosure, the terminal may generate the initial signal by extending the first symbol constituting the SRS.

When the LBT succeeds before a time point at which the terminal needs to transmit the SRS, the terminal may generate the initial signal by extending a CP of the first symbol constituting the SRS as necessary. The length of the initial signal may be indicated as included in the trigger signal indicated by the serving base station to the terminal. The length of the initial signal may be indicated as 0, a preconfigured time corresponding to an integer number of symbols, or a time shortened by a predetermined offset (e.g., the time length used in the LBT procedure (e.g., 25 μs or 16 μs) and a timing advance (TA), etc.) from the preconfigured time. Alternatively, the CP length may be expressed by an index configured by higher layer signaling or an index indicated by the technical specification. Due to the characteristics of the initial signal, the serving base station may secure orthogonality between the signals of the terminals. The length of the initial signal (e.g., the length of the CP, the number of symbols, etc.) may be indicated by the subcarrier spacing of the BWP, or may be indicated by higher layer signaling.

The terminal may transmit the generated initial signal to the base station. The terminal may transmit the initial signal for an entire time interval T from the time point at which the LBT procedure succeeds to the time point of the first symbol, or for only a part of the time interval. Even when the CP of the first symbol constituting the SRS is extended, the conventional process of generating the OFDM symbol may be applied as it is. The reason is that a larger ending part of OFDM samples may simply be disposed in front. When the base station receives the SRS symbol and applies a DFT, the terminal may utilize the remaining OFDM samples except the extended OFDM samples and the OFDM samples of the CP. The terminal may transmit each channel after generating the initial signal in transmitting not only the SRS but also the PUSCH and the PUCCH.

Figure 18:
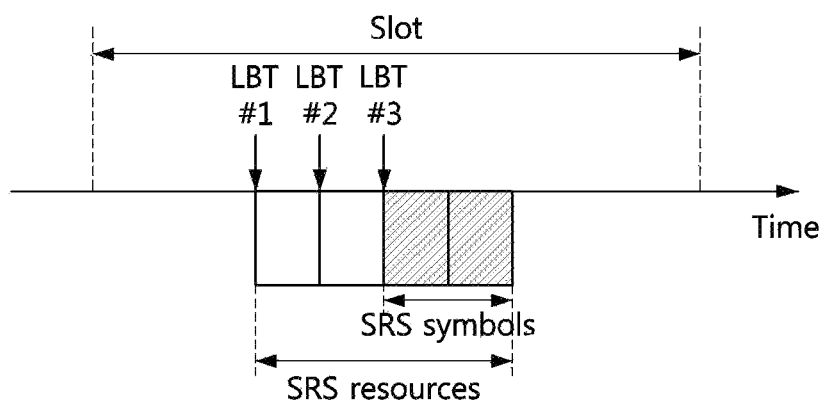
FIG. 18 is a conceptual diagram illustrating a third exemplary embodiment of an SRS resource configuration including at least one symbol.

FIG. 18 is a conceptual diagram illustrating a third exemplary embodiment of an SRS resource configuration including at least one symbol.

Referring to FIG. 18, among the symbols constituting the SRS resource according to an exemplary embodiment of the present disclosure, the SRS may be transmitted from a first time resource for SRS transmission in which the LBT procedure is successful. The SRS may function for each symbol differently from the PUSCH. In the process of decoding the PUSCH, the base station may decode the PUSCH using all symbols. The base station may measure qualities of different radio links using the respective symbols constituting the SRS. The terminal may be assigned at least one PUSCH mapped in a type B scheme, and may transmit from the PUSCH mapped in the type B scheme for which the LBT procedure is successful for the first time. The terminal may transmit the PUSCH mapped in a type A scheme from a first symbol in which the LBT procedure is successful. In this case, the terminal may puncture a symbol (or RE) that has not been transmitted for the encoded TB (or codeword), and may transmit a portion of the codeword mapped to the first symbol in which the LBT procedure is successful.

The terminal may perform the LBT procedure for each time resource for SRS transmission in order to transmit several symbols constituting the SRS. Before transmitting the SRS, it may be assumed that the SRS continuously transmitted may continue to use the LBT subbands. Therefore, the LBT procedure may no longer be performed in the LBT subband that the terminal has already secured using the LBT procedure. However, the terminal may perform the LBT procedure immediately before transmitting the SRS symbol for the LBT subband that has not been secured.

According to an exemplary embodiment of the present disclosure, when the terminal fails the LBT operation in all slots constituting the SRS resource, the terminal may perform the LBT procedure again in the next slot. The index of a symbol constituting the SRS resource in the next slot may be maintained identically to that of the previous slot.

According to another exemplary embodiment of the present disclosure, when the terminal fails the LBT operation in all the slots constituting the SRS resource, the terminal may no longer transmit the SRS. The base station may transmit another trigger signal to the terminal. The terminal that has failed the LBT operation may retransmit the SRS after receiving the new trigger signal from the base station.

Figure 19:
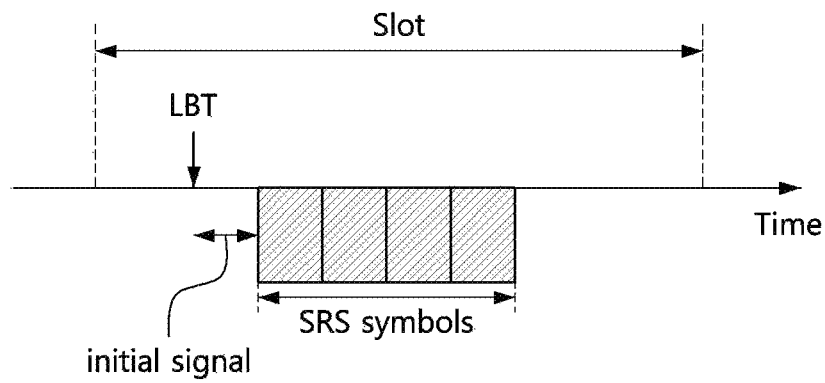
FIG. 19 is a conceptual diagram illustrating a fourth exemplary embodiment of an SRS resource configuration including at least one symbol.

FIG. 19 is a conceptual diagram illustrating a fourth exemplary embodiment of an SRS resource configuration including at least one symbol.

Referring to FIG. 19, according to an exemplary embodiment of the present disclosure, the terminal may transmit an initial signal for the first symbol determined to transmit the SRS. The terminal may succeed in the LBT procedure ahead of time of several tens of ns before transmitting the SRS symbol. The terminal may perform UL transmission from a symbol located after the symbol in which the LBT procedure is successful. In order to prevent occupancy of resources by another communication node (e.g., base station or terminal), the terminal may transmit the initial signal. The terminal may generate the initial signal based on the generated SRS symbol.

When the LBT procedure is successful before the first symbol of the SRS resource, the terminal may use an enlarged CP of the first symbol constituting the SRS as the initial signal. The length of the initial signal may be indicated as being included in the trigger signal transmitted from the serving base station to the terminal. The length of the initial signal may be indicated as 0, a preconfigured time corresponding to an integer number of symbols, or a time shortened by a constant offset (e.g., the time length used for the LBT procedure (e.g., 25 μs or 16 μs) and a timing advance (TA)) from the preconfigured time. Alternatively, the length of CP may be expressed by an index configured by higher layer signaling or an index indicated by the technical specification. Due to the characteristics of the initial signal, the serving base station may secure orthogonality between the signals of the terminals. The length of the initial signal (e.g., the length of the CP, the number of symbols, etc.) may be indicated by the subcarrier spacing of the BWP, or by higher layer signaling. When the LBT procedure is successful immediately before the transmission of the second or subsequent symbol not the first symbol of the SRS, the following method may be applied. For convenience of description, it may be assumed that the time point at which the LBT procedure succeeds is between the symbol n and the symbol n+1 (n=0, 1, 2, . . . ). Before transmitting the first symbol of the SRS, the terminal may secure a time of several tens of ns by the LBT procedure. In addition, after the second or subsequent symbol of the SRS, the terminal may secure a time of tens of us by the LBT procedure.

As a result of performing the LBT procedure, the terminal may not transmit the SRS symbol n to the base station. Accordingly, according to an exemplary embodiment of the present disclosure, the terminal may utilize the enlarged CP of the symbol n+1 constituting the SRS, which is transmitted after the time resource in which the LBT procedure is successful, as the initial signal.

According to another exemplary embodiment of the present disclosure, the terminal may configure the initial signal using the n-th symbol constituting the SRS corresponding to the time resource in which the LBT procedure is successful. Since the time resource in which the LBT procedure succeeds is a period in which the symbol n constituting the SRS is transmitted, the terminal may use the OFDM symbols derived from the symbol n constituting the SRS. The OFDM symbol of the SRS symbol n may be used from the time resource in which the terminal succeeds in the LBT procedure to the starting time point of the symbol n+1 (and CP thereof) constituting the SRS. The base station may not be able to detect an accurate starting time point of UL transmission of the terminal. The base station may detect energy and determine whether the terminal transmits a UL signal and/or channel. The base station may discriminate an OFDM symbol to which a signal is determined to be mapped and the OFDM symbol to which a signal is not mapped on an OFDM symbol basis by performing DFT on a received UL signal and/or channel. The base station may estimate an UL channel using only OFDM symbols to which the signal is mapped (i.e., only a part of the SRS symbol n).

The terminal may secure phase continuity while transmitting a part of the SRS symbol n and the entire SRS symbol n+1. A PAPR of a power amplifier may be instantaneously increased when the terminal starts transmitting the SRS symbol n. In addition, when the terminal transmits the SRS symbol n+1, the PAPR of the power amplifier may be stabilized, and may be the same as the PAPR at the time when all of the SRS symbols are transmitted.

Channel access method of a terminal that transmits UL resource elements (e.g., SRS resource elements, PUSCH) through a BWP across two or more LBT subbands For channel access, also called a category 4 LBT (C4LBT), the terminal may manage a contention window size (CWS) according to a predetermined rule. The terminal may select an arbitrary number smaller than the CWS, and may configure the selected number as a counter N. When the active BWP occupies two or more LBT subbands, the terminal may manage the CWS and the counter value maintained for UL transmission for each LBT subband (i.e., CWS1, N1, CWS2, N2, etc.). One CWS may be defined according to a channel access priority class (CAPC) of the corresponding LBT subband, and this may be expressed as 'per p' for convenience of description. Alternatively, the terminal may manage the CWS and the counter value as common values independent of the LBT subband.

Figure 20:
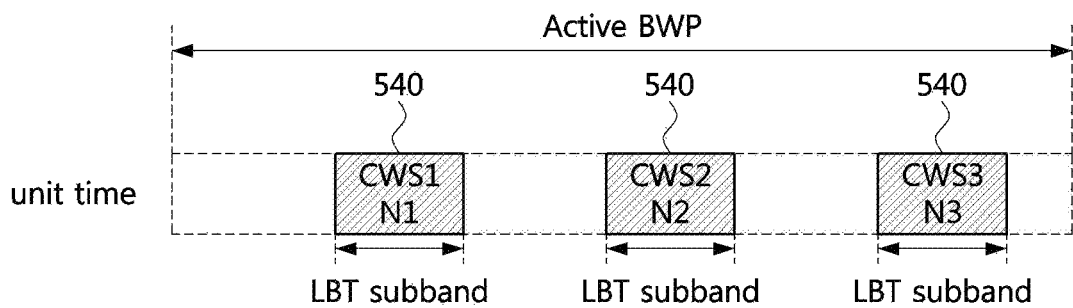
FIG. 20 is a conceptual diagram illustrating a first exemplary embodiment of a contention window size (CWS) and a value N configured in each listen before talk (LBT) subband.

FIG. 20 is a conceptual diagram illustrating a first exemplary embodiment of a CWS and a value N configured in each LBT subband.

Referring to FIG. 20, according to an exemplary embodiment of the present disclosure, the active BWP may have a unique counter value N for each LBT subband (A1). When each LBT subband has a unique N, the terminal may manage a CWS for each LBT subband. Therefore, both of CWS and N may be configured differently for each LBT subband. The terminal may select one N to perform UL transmission. Specifically, the terminal may select one of a plurality of N's (e.g., the counter value N of the LBT subband as a reference). The terminal may select the largest N among the N values of the LBT subbands.

Meanwhile, a method in which a plurality of LBT subbands share one CWS by managing the one CWS in the active BWP may be considered. One CWS may be configured, and thus only one value N may also be defined.

Figure 21:
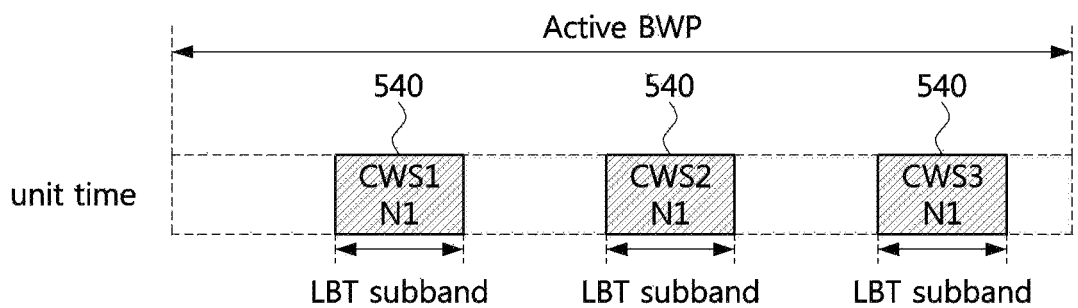
FIG. 21 is a conceptual diagram illustrating a second exemplary embodiment of a CWS and a value N configured in each LBT subband.

FIG. 21 is a conceptual diagram illustrating a second exemplary embodiment of a CWS and a value N configured in each LBT subband.

Referring to FIG. 21, according to an exemplary embodiment of the present disclosure, the terminal may manage one counter value N regardless of the bandwidth of the active BWP (A2). The CWS for configuring the counter value N may be expressed as a function of the CWS of the LBT subbands belonging to the active BWP. For a CAPC of traffic to be transmitted, the terminal may select one LBT subband from among the LBT subbands. For example, the terminal may select the LBT subband having the largest CWS or the smallest CWS among the CWSs of the LBT subbands. The counter value N may be configured based on the CWS of the selected LBT subband.

In order to perform UL transmission, the terminal may configure one counter value N, and may have the CWS for each LBT subband. When the terminal fails to transmit the UL channel in some LBT subbands, or when the terminal transmits a PUSCH but the base station fails to decode the PUSCH, the terminal may update the CWS of the LBT subbands.

When the active BWP includes a plurality of LBT subbands, the terminal may manage a separate CWS to be applied to the LBT subband to which UL transmission is allocated or the LBT subband used for UL transmission in updating the CWS.

According to an exemplary embodiment of the present disclosure, the terminal may manage the CWS for each LBT subband (with one N value). When the terminal receives a NACK for the PUSCH from the base station (e.g., when the NDI toggled in the same HPID, or when receiving the NACK as a downlink feedback indicator (DFI)), the terminal may update the CWSs in all the LBT subbands belonging to the active BWP by reflecting the NACK.

When the terminal fails to perform UL transmission in some of the LBT subbands, the terminal may consider that the UL transmission is not performed through the some of the LBT subbands. Therefore, the terminal may update only the CWS of the LBT subbands in which the UL transmission is performed successfully and/or in which the UL transmission is unsuccessful.

When the base station indicates a UL grant such that only some of the LBT subbands are used in the active BWP, the terminal may use CWSs of the some LBT subbands according to the indicated UL grant. The terminal may select one LBT subband among the LBT subbands. For example, the terminal may select the LBT subband having the largest CWS or the smallest CWS among the CWSs of the LBT subbands. The terminal may configure the counter N based on the CWS of the selected LBT subband.

Figure 22:
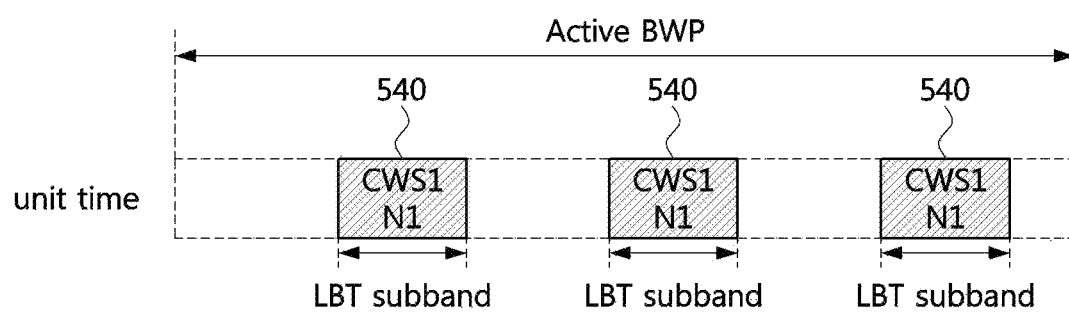
FIG. 22 is a conceptual diagram illustrating a third exemplary embodiment of a CWS and a value N configured in each LBT subband.

FIG. 22 is a conceptual diagram illustrating a third exemplary embodiment of a CWS and a value N configured in each LBT subband.

Referring to FIG. 22, according to an exemplary embodiment of the present disclosure, the terminal may manage one CWS for the active BWP. Therefore, at least one or more LBT subbands may share one CWS (with one N value).

The terminal may transmit only one UL signal and/or channel in the BWP. Accordingly, the terminal may select one CWS as a reference or define only one CWS without managing the CWS for each of the LBT subbands in at least one LBT subband (per p).

When the terminal fails to perform UL transmission in some of the LBT subbands, the terminal may update the CWS in consideration of the number of the LBT subbands in which the UL transmission fails. The terminal may manage one CWS. Therefore, when the terminal updates the CWS due to the LBT subband(s) in which the UL transmission fails, the terminal may apply the updated CWS to the LBT subband(s) in which the LBT procedure is successful (for all p).

When the terminal is assigned a PUSCH in N LBT subbands and transmits the PUSCH through M (<N) LBT subbands, the terminal may retransmit the PUSCH. The base station may indicate a UL grant to the terminal without toggling an NDI with the same HARQ process ID (HPID). The terminal may increase the size of the CWS. Since N is limited to 1 according to the conventional scheme, the size of CWS may be increased by one or may be maintained as a maximum value (e.g., CWSp,max).

According to an exemplary embodiment of the present disclosure, the size of the CWS may be given as a function of M. According to an exemplary embodiment, as the CWS is updated, the size of the CWS may increase by M. Alternatively, as the CWS is updated, the size of the CWS may have a maximum value (per p). That is, when the CWS is updated, the size of the CWS may be updated to a smaller value among CWSp+M and CWSp,max.

According to another exemplary embodiment, as the terminal updates the CWS, the size of the CWS may increase by M/N. Alternatively, as the CWS is updated, the size of the CWS may have a maximum value (per p). That is, when the CWS is updated, the size of the CWS may be updated to a smaller value among CWSp+M/N and CWSp,max.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   receiving first configuration information on sounding reference signal (SRS) from a base station, the first configuration information including resource mapping information of the SRS;
   receiving second configuration information including information on a first length of a cycle prefix (CP) extension and information on a second length of the CP extension from the base station;
   receiving control information including information indicating a length of a prefix signal prior to the SRS from the base station, the length of the prefix signal being determined based on one of a plurality of lengths of the CP extension including the first and second lengths; and
   transmitting the prefix signal having the indicated length and the SRS to the base station.

2. The operation method of claim 1, wherein each of the first and second lengths indicates a number of symbols for the CP extension.

3. The operation method of claim 1, wherein each of the first and second lengths depends on subcarrier spacing.

4. The operation method of claim 1, wherein the length of the prefix signal is a value obtained by subtracting a predefined value from the one of the plurality of lengths of the CP extension.

5. The operation method of claim 4, wherein the predefined value is 0, 25 µs, 16 µs+timing advance (TA), or 25 µs+TA.

6. The operation method of claim 4, wherein the predefined value indicates duration used for a listen before talk (LBT) operation.

7. The operation method of claim 1, wherein a location of the SRS is not restricted to a last symbol in a slot, and remaining symbol(s) after an ending symbol of the SRS in the slot is used for communication with other terminal.

8. The operation method of claim 1, wherein the prefix signal includes a CP of a first symbol of the SRS.

9. The operation method of claim 1, wherein the control information further includes information requesting transmission of the SRS.

10. The operation method of claim 1, wherein the resource mapping information of the SRS includes information on a location of a first symbol of the SRS and information on a number of symbols of the SRS.

11. An operation method of a base station in a communication system, the operation method comprising:
    transmitting first configuration information on sounding reference signal (SRS) to a terminal, the first configuration information including resource mapping information of the SRS;
    transmitting second configuration information including information on a first length of a cycle prefix (CP) extension and information on a second length of the CP extension to the terminal;
    transmitting control information including information indicating a length of a prefix signal prior to the SRS to the terminal, the length of the prefix signal being determined based on one of a plurality of lengths of the CP extension including the first and second lengths; and
    receiving the prefix signal having the indicated length and the SRS from the terminal.

12. The operation method of claim 11, wherein each of the first and second lengths indicates a number of symbols for the CP extension.

13. The operation method of claim 11, wherein each of the first and second lengths depends on subcarrier spacing.

14. The operation method of claim 11, wherein the length of the prefix signal is a value obtained by subtracting a predefined value from the one of the plurality of lengths of the CP extension.

15. The operation method of claim 14, wherein the predefined value is 0, 25 µs, 16 µs+timing advance (TA), or 25 µs+TA.

16. The operation method of claim 14, wherein the predefined value indicates duration used for a listen before talk (LBT) operation.

17. The operation method of claim 11, wherein a location of the SRS is not restricted to a last symbol in a slot, and remaining symbol(s) after an ending symbol of the SRS in the slot is used for communication with other terminal.

18. The operation method of claim 11, wherein the prefix signal includes a CP of a first symbol of the SRS.

19. The operation method of claim 11, wherein the control information further includes information requesting transmission of the SRS.

20. The operation method of claim 11, wherein the resource mapping information of the SRS includes information on a location of a first symbol of the SRS and information on a number of symbols of the SRS.

* * * * *